(12) United States Patent
Sasagawa

(10) Patent No.: US 11,220,009 B2
(45) Date of Patent: Jan. 11, 2022

(54) INTERACTION DEVICE, INTERACTION METHOD, RECORDING MEDIUM STORING INTERACTION PROGRAM, AND ROBOT

(71) Applicant: Panasonic Intellectual Property Management Co., Ltd., Osaka (JP)

(72) Inventor: Michiko Sasagawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 642 days.

(21) Appl. No.: 16/170,025

(22) Filed: Oct. 24, 2018

(65) Prior Publication Data

US 2019/0262998 A1 Aug. 29, 2019

(30) Foreign Application Priority Data

Feb. 23, 2018 (JP) .............................. JP2018-030751

(51) Int. Cl.
| | |
|---|---|
| *G06F 17/00* | (2019.01) |
| *B25J 11/00* | (2006.01) |
| *G06K 9/00* | (2006.01) |
| *G06N 3/00* | (2006.01) |
| *G10L 15/26* | (2006.01) |
| *G10L 15/00* | (2013.01) |

(52) U.S. Cl.
CPC ....... *B25J 11/0015* (2013.01); *G06K 9/00288* (2013.01); *G06K 9/00664* (2013.01); *G06N 3/008* (2013.01); *G10L 15/26* (2013.01); *G10L 15/00* (2013.01)

(58) Field of Classification Search
CPC .... B25J 11/0015; B25J 13/08; B25J 11/0005; G10L 15/26; G10L 15/00; G06K 9/00664; G06K 9/00288; G06N 3/008
USPC ......................................................... 700/246
See application file for complete search history.

(56) References Cited

U.S. PATENT DOCUMENTS

| | | | | |
|---|---|---|---|---|
| 7,539,556 | B2* | 5/2009 | Oohashi ............. | G06K 9/00664 700/245 |
| 7,620,202 | B2* | 11/2009 | Fujimura ............. | G06K 9/6214 382/103 |
| 7,702,420 | B2* | 4/2010 | Goto .................... | G05D 1/0246 700/247 |

(Continued)

FOREIGN PATENT DOCUMENTS

| | | |
|---|---|---|
| JP | 2011-200947 | 10/2011 |
| JP | 2013-188815 | 9/2013 |

*Primary Examiner* — Ronnie M Mancho
(74) *Attorney, Agent, or Firm* — Greenblum & Bernstein, P.L.C.

(57) ABSTRACT

A device includes a camera, a microphone, a driving mechanism, and a memory. The processor determines whether or not a first person appears in a video acquired by the camera, or whether or not speech of the first person is included in a sound acquired by the microphone, when the driving mechanism is to start driving in accordance with predetermined content executed by the device. The first person being a subject person requiring predetermined attention when the device makes contact therewith. The processor determines whether or not the device is moving, when the first person appears in the video, or when the speech of the first person is included in the sound. The processor controls the driving mechanism to stop movement of the device, when the device is moving.

14 Claims, 12 Drawing Sheets

(56) References Cited

U.S. PATENT DOCUMENTS

| | | | |
|---|---|---|---|
| 7,756,322 B2* | 7/2010 | Saitou | H04N 1/00137 382/153 |
| 7,877,165 B2* | 1/2011 | Sugiyama | B62D 57/032 700/245 |
| 8,116,908 B2* | 2/2012 | Ng-Thow-Hing | B25J 9/1664 700/245 |
| 8,209,179 B2* | 6/2012 | Aoyama | G10L 15/22 704/257 |
| 8,406,925 B2* | 3/2013 | Sarvadevabhatla | B25J 9/1602 700/259 |
| 9,431,027 B2* | 8/2016 | Ng-Thow-Hing | G10L 13/00 |
| 9,849,591 B2* | 12/2017 | Michel | B25J 9/1697 |
| 2004/0138780 A1* | 7/2004 | Lewis | B25J 13/081 700/245 |
| 2005/0065650 A1* | 3/2005 | Lewis | B25J 19/021 700/245 |
| 2005/0215171 A1* | 9/2005 | Oonaka | A61B 5/01 446/301 |
| 2005/0271279 A1* | 12/2005 | Fujimura | G06K 9/00389 382/203 |
| 2006/0155765 A1* | 7/2006 | Takeuchi | G06F 16/3329 |
| 2007/0152619 A1* | 7/2007 | Sugiyama | B25J 9/1612 318/568.12 |
| 2008/0071540 A1* | 3/2008 | Nakano | G10L 15/20 704/251 |
| 2008/0263164 A1* | 10/2008 | Portele | H04M 1/72436 709/206 |
| 2009/0080699 A1* | 3/2009 | Ng-Thow-Hing | G06T 7/73 382/103 |
| 2009/0290758 A1* | 11/2009 | Ng-Thow-Hing | G06T 7/536 382/106 |
| 2010/0329479 A1* | 12/2010 | Nakadai | B25J 9/00 381/92 |
| 2012/0209433 A1* | 8/2012 | Paz Rodriguez | B25J 11/0005 700/259 |
| 2014/0039675 A1* | 2/2014 | Ead | G06N 3/008 700/245 |

* cited by examiner

FIG. 4

| | PERSON ID | NAME | ATTRIBUTE | NICKNAME | DATE OF BIRTH | SUBJECT FLAG |
|---|---|---|---|---|---|---|
| 210 | 1 | YOUSUKE | PARENT | DAD | 09/01/1985 | 0 |
| 220 | 2 | KUMI | PARENT | MOM | 10/05/1986 | 0 |
| 230 | 3 | HARU | CHILD | HARU-KUN | 07/01/2012 | 0 |
| 240 | 4 | AI | CHILD | AI-CHAN | 09/25/2016 | 1 |

FIG. 5

| | CONDITION ID | CONDITION | AGE IN MONTHS |
|---|---|---|---|
| 310 | 1 | STANDING ASSISTED | 5 TO 15 MONTHS |
| 320 | 2 | WALKING UNASSISTED | 8 TO 17 MONTHS |

FIG. 6

| AGE IN MONTHS | LIFTING ONE'S HEAD | TURNING OVER IN BED | SITTING UNASSISTED | CRAWLING | STANDING ASSISTED | WALKING UNASSISTED (%) |
|---|---|---|---|---|---|---|
| 2 TO 3 MONTHS | 11.7 | 1.1 | | | | |
| 3 TO 4 MONTHS | 63.0 | 14.4 | | | | |
| 4 TO 5 MONTHS | 93.8 | 52.7 | 0.5 | 0.9 | | |
| 5 TO 6 MONTHS | 98.7 | 86.6 | 7.7 | 5.5 | 0.5 | |
| 6 TO 7 MONTHS | 99.5 | 95.8 | 33.6 | 22.6 | 9.0 | |
| 7 TO 8 MONTHS | | 99.2 | 68.1 | 51.1 | 33.6 | |
| 8 TO 9 MONTHS | | 98.0 | 86.3 | 75.4 | 57.4 | 1.0 |
| 9 TO 10 MONTHS | | | 96.1 | 90.3 | 80.5 | 4.9 |
| 10 TO 11 MONTHS | | | 97.5 | 93.5 | 89.6 | 11.2 |
| 11 TO 12 MONTHS | | | 98.1 | 95.8 | 91.6 | 35.8 |
| 12 TO 13 MONTHS | | | 99.6 | 96.9 | 97.3 | 49.3 |
| 13 TO 14 MONTHS | | | | 97.2 | 96.7 | 71.4 |
| 14 TO 15 MONTHS | | | | 98.9 | 99.5 | 81.1 |
| 15 TO 16 MONTHS | | | | 99.4 | | 92.6 |
| 16 TO 17 MONTHS | | | | 99.5 | | 100.0 |

INTERACTION DEVICE, INTERACTION METHOD, RECORDING MEDIUM STORING INTERACTION PROGRAM, AND ROBOT

BACKGROUND

1. Technical Field

The present disclosure relates to a device, a method, a recording medium storing a program, and a robot for interacting with a user.

2. Description of the Related Art

Various safety-conscious action control methods for robots have been proposed in the past.

For example, Japanese Unexamined Patent Application Publication No. 2013-188815 discloses a method for controlling the actions of a robot device that does not require a safety fence, while implementing safety measures in such a way that the robot device does not cause a contact accident with a user. Specifically, a control device in Japanese Unexamined Patent Application Publication No. 2013-188815 detects an object that is about to collide with the robot device, detects the motion state of the detected object, acquires response action characteristics relating to a collision between the detected object and the robot device, determines whether or not there will be a collision between the robot device and the object and determines a collision avoidance action to be carried out by the robot device, on the basis of the motion state of the detected object and the response action characteristics of the object, and controls the movement of the robot device in accordance with the determined collision avoidance action.

Furthermore, Japanese Unexamined Patent Application Publication No. 2011-200947 discloses a method for controlling a robot while ensuring the safety of a user whose actions are difficult to predict such as an elderly person or a child, for example. Specifically, the control device in Japanese Unexamined Patent Application Publication No. 2011-200947 controls the actions of a mobile body on the basis of predetermined control parameters, stores characteristic information of objects in association with danger information relating to the objects, recognizes the characteristic information of an object, detects the distance between the recognized object and the mobile body, and determines the control parameters from the detection result and the danger information corresponding to the characteristic information of the object. In the danger information, a danger area is an area having a radius that is smaller than a first threshold value with the position of the object being taken as the center thereof, and a caution area is an area having a radius that is greater than or equal to the first threshold value and less than or equal to a second threshold value with the position of the object being taken as the center thereof. According to Japanese Unexamined Patent Application Publication No. 2011-200947, it becomes possible to ensure safety when a robot performs an action, by recording people whose actions are difficult to predict such as elderly people or children, in association with danger information.

SUMMARY

In cases where a robot for an infant is to be used at home, there is a demand for increasing the involvement between the infant or the family of the infant and the robot while ensuring the safety of the infant. In particular, infants less than one year old who are in the developmental stage of walking often fall over, and therefore the risk of an infant falling over may increase due to the robot approaching the infant and causing the infant to become excited.

However, in the aforementioned techniques, while ensuring the safety of a subject person who requires predetermined attention when a robot makes contact, the subject person and the robot do not interact, and therefore further improvement is required.

One non-limiting and exemplary embodiment provides a device, a method, a recording medium storing a program, and a robot with which it is possible for a first person and the device to interact while ensuring the safety of the first person, the first person being a subject person requiring predetermined attention when the device makes contact.

In one general aspect, the techniques disclosed here feature a device that interacts with a user, provided with: a camera that acquires a video of the periphery of the device; a microphone that acquires a sound from the periphery of the device; a driving mechanism that drives the device; a memory; and a processor, in which the processor determines whether or not a first person appears in the video, or whether or not speech of the first person is included in the sound, in a case where it is detected that the driving mechanism is to start driving in accordance with predetermined content executed by the device, the first person being designated as a subject person in first data stored in the memory, the first data indicating at least attributes of a plurality of people and whether or not the plurality of people are a predetermined subject person, and the predetermined subject person being a person requiring predetermined attention when the device makes contact, determines whether or not the device is moving, in a case where it is determined that the first person appears in the video, or in a case where it is determined that the speech of the first person is included in the sound, and controls the driving mechanism to stop movement of the device, in a case where it is determined that the device is moving.

According to the present disclosure, it is possible for a first person and a device to interact while ensuring the safety of the first person, the first person being a subject person requiring predetermined attention when the device makes contact.

These general and specific aspects may be implemented using a computer program, and any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a drawing depicting an example of person information in the embodiment of the present disclosure;

FIG. 5 is a drawing depicting an example of subject condition information in the embodiment of the present disclosure;

FIG. 6 is a drawing depicting an example of motor skill pass rates of infants and preschool children;

Figure 1:
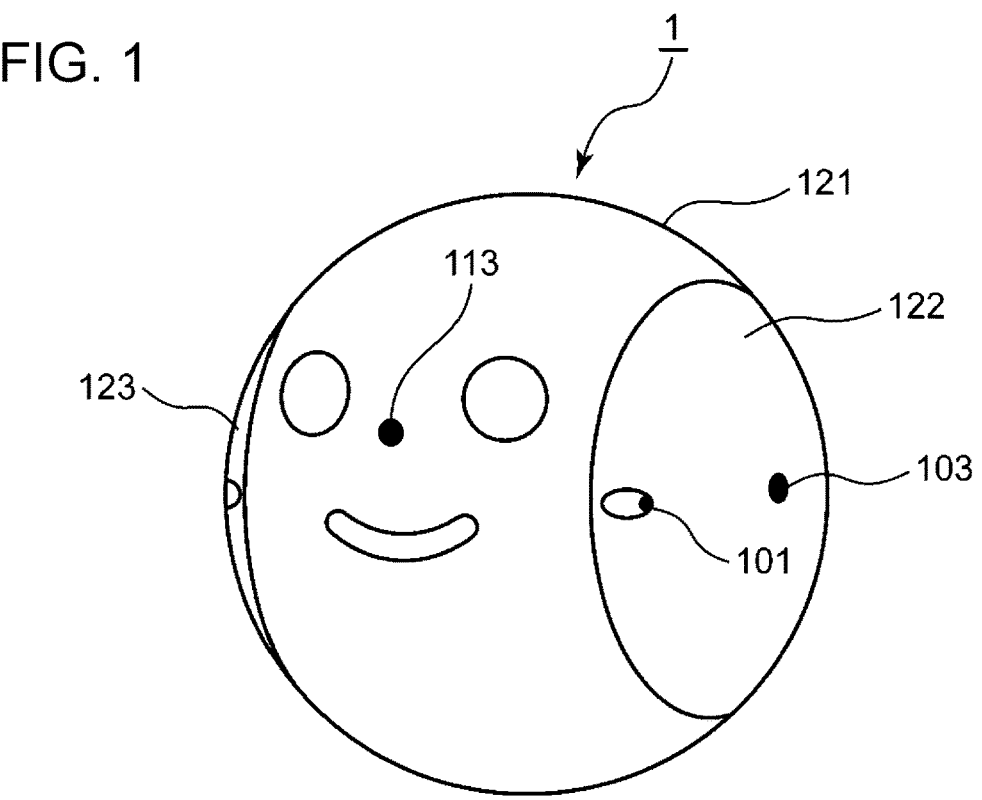
FIG. 1 is an external perspective view of a robot that is an example of an interaction device according to an embodiment of the present disclosure.

DETAILED DESCRIPTION (Underlying Knowledge Forming Basis of the Present Disclosure)

In the aforementioned Japanese Unexamined Patent Application Publication No. 2013-188815, the actions of a robot device are controlled so as to avoid a collision between the robot device and an object, on the basis of the motion state and response action characteristics of the object with which the robot device is about to collide. However, while ensuring the safety of a subject person who requires predetermined attention when the robot device makes contact, the subject person and the robot device do not interact. Furthermore, actions are not controlled on the basis of the action subject with whom the robot device performs an action.

Similarly, in the aforementioned Japanese Unexamined Patent Application Publication No. 2011-200947, an object and a danger area are associated, and the actions of a robot are controlled in such a way that the robot does not enter the danger area associated with the object. However, while ensuring the safety of a subject person requiring predetermined attention when the robot makes contact, the subject person and the robot do not interact. Furthermore, actions are not controlled on the basis of the action subject with whom the robot performs an action.

Therefore, controlling the actions of a robot on the basis of the relationship with the action subject with whom the robot performs an action is not realized in either of the aforementioned Japanese Unexamined Patent Application Publication Nos. 2013-188815 and 2011-200947. Furthermore, for example, it is not possible to control the actions of the robot in such a way that the robot is able to play safely with an infant with the intention of a parent of the infant having been reflected.

In order to solve the aforementioned problem, a device according to an aspect of the present disclosure is a device that interacts with a user, provided with: a camera that acquires a video of the periphery of the device; a microphone that acquires a sound from the periphery of the device; a driving mechanism that drives the device; a memory; and a processor, in which the processor determines whether or not a first person appears in the video, or whether or not speech of the first person is included in the sound, in a case where it is detected that the driving mechanism is to start driving in accordance with predetermined content executed by the device, the first person being designated as a subject person in first data stored in the memory, the first data indicating at least attributes of a plurality of people and whether or not the plurality of people are a predetermined subject person, and the predetermined subject person being a person requiring predetermined attention when the device makes contact, determines whether or not the device is moving, in a case where it is determined that the first person appears in the video, or in a case where it is determined that the speech of the first person is included in the sound, and controls the driving mechanism to stop movement of the device, in a case where it is determined that the device is moving.

According to this configuration, in a case where it is detected that a driving mechanism is to start driving in accordance with predetermined content executed by the device, it is determined whether or not a first person appears in a video of the periphery of a device acquired by a camera, or whether or not speech of the first person is included in a sound from the periphery of the device acquired by a microphone. The first person is designated as a subject person in first data stored in a memory. The first data indicates at least the attributes of a plurality of people and whether or not the plurality of people are a predetermined subject person. A predetermined subject person is a person requiring predetermined attention when the device makes contact. In a case where it has been determined that the first person appears in the video, or in a case where it has been determined that the speech of the first person is included in the sound, it is determined whether or not the device is moving. In a case where it has been determined that the device is moving, the driving mechanism is controlled for the movement of the device to be stopped.

Consequently, in a case where the first person who is a subject person requiring predetermined attention when the device makes contact is in the periphery of the device and the device is moving, the movement of the device is stopped, and it is therefore possible for the first person and the device to interact while ensuring the safety of the first person who is a subject person requiring predetermined attention when the device makes contact.

Furthermore, in the aforementioned device, the processor may control the driving mechanism to rotate the device, in a case where it is detected that the driving mechanism is to start driving in accordance with the predetermined content, and cause the camera to acquire the video when the device is rotating.

According to this configuration, in a case where it is detected that the driving mechanism is to start driving in accordance with the predetermined content, the driving mechanism is controlled for the device to rotate, and the video is acquired by the camera when the device is rotating. Consequently, due to the device rotating, it is possible to acquire the video of the periphery of the device.

Furthermore, in the aforementioned device, a speaker and a display may be further provided, and the processor may cause the speaker to output speech requesting a second person to play together with the first person and the device, after the device has stopped moving, the second person being indicated as a guardian of the first person by the attributes in the first data, select first content for playing together with the first person and the second person, on the basis of second data stored in the memory, in a case where a positive response to playing together is acquired from the second person from the video or the sound, the second data indicating content for the device to play with the user, and the first content including content that involves movement of the device and content that does not involve movement of the device, and carry out, in accordance with the first content, at least any of: (i) processing in which the speaker is controlled to output speech that corresponds to the first content; (ii) processing in which the display is controlled to output a representation that corresponds to the first content, the display displaying a facial expression for the device by means of both eyes and a mouth; and (iii) processing in which the driving mechanism is controlled to cause a movement that corresponds to the first content.

According to this configuration, speech requesting a second person to play together with the first person and the device is output by the speaker after the device has stopped moving. The second person is indicated as a guardian of the first person by the attributes in the first data. In a case where a positive response to playing together has been acquired from the second person from the video or the sound, first content for playing together with the first person and the second person is selected on the basis of second data stored in the memory. The second data indicates content for the device to play with the user. The first content includes content that involves movement of the device and content that does not involve movement of the device. In accordance with the first content, at least any of the following is performed: (i) processing in which the speaker is controlled to output speech that corresponds to the first content; (ii) processing in which the display is controlled to output a representation that corresponds to the first content, the display displaying a facial expression for the device by means of both eyes and a mouth; and (iii) processing in which the driving mechanism is controlled to cause a movement that corresponds to the first content.

Consequently, in a case where playing together with the first person and the device has been agreed to after the device has stopped moving by the second person who is a guardian of the first person, first content for the device to play together with the first person and the second person is selected, and at least any of the speech processing, the display processing, and the movement processing that correspond to the first content is carried out. It is therefore possible to increase opportunities for the first person to interact with the device with the intention of the second person having been reflected.

Furthermore, in the aforementioned device, the processor may determine whether or not the sound includes speech of the first person or a third person requesting to play with the device, in a case where a positive response to playing together is not acquired from the second person from the video or the sound, the third person being different from the first person and the second person, and the third person not being designated as a subject person in the first data, select second content for playing together with the first person and the third person, on the basis of the second data, in a case where it is determined that the sound includes speech of the first person or the third person requesting to play with the device in a manner that does not involve movement of the device, the second content being content that does not involve movement of the device, and carry out, in accordance with the second content, at least any of: (i) processing in which the speaker is controlled to output speech that corresponds to the second content; (ii) processing in which the display is controlled to output a representation that corresponds to the second content, the display displaying a facial expression for the device by means of both eyes and a mouth; and (iii) processing in which the driving mechanism is controlled to cause a movement that corresponds to the second content.

According to this configuration, in a case where a positive response to playing together has not been acquired from the second person from the video or the sound, it is determined whether or not the sound includes speech of the first person or a third person requesting to play with the device. The third person is different from the first person and the second person, and is not designated as a subject person in the first data. In a case where it has been determined that the sound includes speech of the first person or the third person requesting to play with the device in a manner that does not involve movement of the device, second content for playing together with the first person and the third person is selected on the basis of the second data. The second content does not involve movement of the device. In accordance with the second content, at least any of the following is performed: (i) processing in which the speaker is controlled to output speech that corresponds to the second content; (ii) processing in which the display is controlled to output a representation that corresponds to the second content, the display displaying a facial expression for the device by means of both eyes and a mouth; and (iii) processing in which the driving mechanism is controlled to cause a movement that corresponds to the second content.

Consequently, even if playing together with the first person and the device has not been agreed to by the second person who is a guardian of the first person, when a request to play with the device in a manner that does not involve movement of the device has been made from the first person or a third person who is different from the first person and the second person and is not a subject person, playing in a manner that does not involve movement of the device is carried out. It is therefore possible to further increase opportunities for the first person to interact with the device while ensuring the safety of the first person.

Furthermore, in the aforementioned device, the processor may determine whether or not the sound includes speech of the first person or a third person requesting to play with the device, in a case where a positive response to playing together is not acquired from the second person from the video or the sound, the third person being different from the first person and the second person, and the third person not being designated as a subject person in the first data, cause the speaker to output speech for notifying that the device is to sleep thereafter, or speech indicating a snoring sound, in a case where it is determined that the sound does not include speech of the first person or the third person requesting to play with the device, and cause the display to display a facial expression in which both eyes are closed.

According to this configuration, in a case where a positive response to playing together has not been acquired from the second person from the video or the sound, it is determined whether or not the sound includes speech of the first person or a third person requesting to play with the device. The third person is different from the first person and the second person, and is not designated as a subject person in the first data. In a case where it has been determined that the sound does not include speech of the first person or the third person requesting to play with the device, speech for notifying that the device is to sleep thereafter or speech that indicates a snoring sound is output by the speaker, and a facial expression in which both eyes are closed is displayed by the display.

Consequently, in a case where playing together with the first person and the device has not been agreed to by the second person who is a guardian of the first person, and a request to play with the device has not been made by the first person or a third person who is different from the first person and the second person and is not a subject person, speech for notifying that the device is to sleep thereafter or speech that indicates a snoring sound is output by the speaker, and a facial expression in which both eyes are closed is displayed by the display. It is therefore possible to prioritize the safety of the first person, and to avoid proactive involvement with the device from the first person.

Furthermore, in the aforementioned device, the processor may calculate the distance between the first person and the second person on the basis of the video, after having carried out processing of at least any of the (i), the (ii), and the (iii) in accordance with the selected first content, cause the speaker to output speech that confirms with the second person as to whether or not it is possible to play together with the first person and the device, in a case where the distance is not less than a threshold value, select second content for playing together with the first person and a third person, on the basis of the second data, in a case where a positive response to playing together is not acquired from the second person from the video or the sound, and it is determined that the sound includes speech of the first person or the third person requesting to play with the device in a manner that does not involve movement of the device, the third person being different from the first person and the second person, the third person not being designated as a subject person in the first data, and the second content being content that does not involve movement of the device, and carry out, in accordance with the second content, at least any of: (i) processing in which the speaker is controlled to output speech that corresponds to the second content; (ii) processing in which the display is controlled to output a representation that corresponds to the second content, the display displaying a facial expression for the device by means of both eyes and a mouth; and (iii) processing in which the driving mechanism is controlled to cause a movement that corresponds to the second content.

According to this configuration, after processing of at least any of (i), (ii), and (iii) has been carried out in accordance with the selected first content, the distance between the first person and the second person is calculated on the basis of the video. In a case where the distance is not less than a threshold value, speech that confirms with the second person as to whether or not it is possible to play together with the first person and the device is output by the speaker. In a case where a positive response to playing together has not been acquired from the second person from the video or the sound, and it has been determined that the sound includes speech of the first person or the third person requesting to play with the device in a manner that does not involve movement of the device, second content for playing together with the first person and a third person is selected on the basis of the second data. The third person is different from the first person and the second person, and is not designated as a subject person in the first data. The second content does not involve movement of the device. In accordance with the second content, at least any of the following is performed: (i) processing in which the speaker is controlled to output speech that corresponds to the second content; (ii) processing in which the display is controlled to output a representation that corresponds to the second content, the display displaying a facial expression for the device by means of both eyes and a mouth; and (iii) processing in which the driving mechanism is controlled to cause a movement that corresponds to the second content.

Consequently, in a case where the distance between the first person and the second person who is a guardian of the first person is greater than or equal to the threshold value, it is confirmed with the second person as to whether or not it is possible to play together with the first person and the device, and, in a case where a positive response to playing together has not been acquired from the second person, and a request to play with the device in a manner that does not involve movement of the device has been made from the first person or a third person who is different from the first person and the second person and is not a subject person, playing that does not involve movement of the device is carried out. It is therefore possible to further increase opportunities for the first person to interact with the device while ensuring the safety of the first person, even if the second person has moved away from the first person.

Furthermore, in the aforementioned device, the processor may calculate the distance between the first person and the second person on the basis of the video, after having carried out processing of at least any of the (i), the (ii), and the (iii) in accordance with the selected first content, cause the speaker to output speech that confirms with the second person as to whether or not it is possible to play together with the first person and the device, in a case where the distance is not less than a threshold value, cause the speaker to output speech for notifying that the device is to sleep thereafter, or speech indicating a snoring sound, in a case where a positive response to playing together is not acquired from the second person from the video or the sound, and it is determined that the sound does not include speech of the first person or a third person requesting to play with the device, the third person being different from the first person and the second person, and the third person not being designated as a subject person in the first data, and cause the display to display a facial expression in which both eyes are closed.

According to this configuration, after processing of at least any of (i), (ii), and (iii) has been carried out in accordance with the selected first content, the distance between the first person and the second person is calculated on the basis of the video. In a case where the distance is not less than a threshold value, speech that confirms with the second person as to whether or not it is possible to play together with the first person and the device is output by the speaker. In a case where a positive response to playing together has not been acquired from the second person from the video or the sound, and it has been determined that the sound does not include speech of the first person or a third person requesting to play with the device, speech for notifying that the device is to sleep thereafter or speech indicating a snoring sound is output by the speaker. The third person is different from the first person and the second person, and is not designated as a subject person in the first data. A facial expression in which both eyes are closed is displayed by the display.

Consequently, in a case where the distance between the first person and the second person who is a guardian of the first person is greater than or equal to the threshold value, it is confirmed with the second person as to whether or not it is possible to play together with the first person and the device, and, in a case where a positive response to playing together is not acquired from the second person, and a request to play with the device is not made from the first person or a third person who is different from the first person and the second person and is not a subject person, speech for notifying that the device is to sleep thereafter or speech that indicates a snoring sound is output by the speaker, and a facial expression in which both eyes are closed is displayed by the display. Therefore, in a case where the second person has moved away from the first person, it is possible to prioritize the safety of the first person, and to avoid proactive involvement with the device from the first person.

Furthermore, in the aforementioned device, execution of the predetermined content may be permitted by the second person.

According to this configuration, predetermined content that is permitted by the second person who is a guardian of the first person is executed, and therefore the safety of the first person can be further increased.

Furthermore, in the aforementioned device, a speaker and a display may be further provided, and the processor may calculate the distance to the first person on the basis of the video, after the device has stopped moving, determine whether or not the first person is sitting, on the basis of the video, in a case where the distance is less than a threshold value, and, in a case where it is determined that the first person is not sitting, carry out at least any of: (i) processing in which the speaker is made to output speech that prompts the first person to sit; (ii) processing in which the display is made to face downward; and (iii) processing in which the display is made to display a predetermined representation, the display displaying a facial expression for the device by means of eyes and a mouth, and the predetermined representation indicating a sad facial expression.

According to this configuration, the distance to the first person is calculated on the basis of the video after the device has stopped moving. In a case where the distance is less than a threshold value, whether or not the first person is sitting is determined on the basis of the video. In a case where it has been determined that the first person is not sitting, at least any of the following is carried out: (i) processing in which the speaker is made to output speech that prompts the first person to sit; (ii) processing in which the display is made to face downward; and (iii) processing in which the display is made to display a predetermined representation. The display displays a facial expression for the device by means of eyes and a mouth. The predetermined representation indicates a sad facial expression.

Consequently, in a case where the distance to the first person is less than the threshold value, and the first person is not sitting, the first person is prompted to sit, and therefore the safety of the first person can be further increased.

Furthermore, in the aforementioned device, a speaker may be further provided, the first data may further indicate dates of birth of the plurality of people, and the processor may refer to the first data and third data stored in the memory, to determine whether or not the first person corresponds to an age in months as a subject person, in a case where it is determined that the first person appears in the video, the third data indicating a range for the age in months as a subject person, control the speaker to output speech that confirms with the second person as to whether or not the first person may be excluded from being a subject person, in a case where it is determined that the first person does not correspond to the age in months as a subject person, the second person being indicated as a guardian of the first person by the attributes in the first data, and cancel a designation of the first person as a subject person in the first data, in a case where a positive response to excluding the first person from being a subject person is acquired from the second person from the video or the sound.

According to this configuration, the first data indicates dates of birth of the plurality of people. In a case where it has been determined that the first person appears in the video, reference is made to the first data and third data stored in the memory, for it to be determined whether or not the first person corresponds to an age in months as a subject person. The third data indicates a range for the age in months as a subject person. In a case where it has been determined that the first person does not correspond to an age in months as a subject person, the speaker is controlled in such a way that speech confirming with the second person as to whether the first person may be excluded from being a subject person is output. The second person is indicated as a guardian of the first person by the attributes in the first data. In a case where a positive response to excluding the first person from being a subject person is acquired from the second person from the video or the sound, the designation of the first person as a subject person is canceled in the first data.

Consequently, in a case where the first person no longer corresponds to an age in months as a subject person, whether the first person may be excluded from being a subject person is confirmed with the second person who is a guardian of the first person, and it is therefore possible to determine whether or not the first person is to be excluded from being a subject person, in accordance with the actual development of the first person.

Furthermore, in the aforementioned device, the first data may further indicate dates of birth of the plurality of people, and the processor may refer to the first data and third data stored in the memory, to determine whether or not the first person corresponds to an age in months as a subject person, in a case where it is determined that the first person appears in the video, the third data indicating a range for the age in months as a subject person, transmit a notification that confirms whether the first person may be excluded from being a subject person, to a terminal of the second person, in a case where it is determined that the first person does not correspond to the age in months as a subject person, the second person being indicated as a guardian of the first person by the attributes in the first data, and cancel a designation of the first person as a subject person in the first data, in a case where a notification that indicates consent to excluding the first person from being a subject person is received from the terminal.

According to this configuration, the first data indicates dates of birth of the plurality of people. In a case where it has been determined that the first person appears in the video, reference is made to the first data and third data stored in the memory, for it to be determined whether or not the first person corresponds to an age in months as a subject person. The third data indicates a range for the age in months as a subject person. In a case where it has been determined that the first person does not correspond to the age in months as a subject person, a notification that confirms whether the first person may be excluded from being a subject person is transmitted to a terminal of the second person. The second person is indicated as a guardian of the first person by the attributes in the first data. In a case where a notification that indicates consent to excluding the first person from being a subject person is received from the terminal, the designation of the first person as a subject person is canceled in the first data.

Consequently, in a case where the first person no longer corresponds to an age in months as a subject person, whether the first person may be excluded from being a subject person is confirmed with the second person who is a guardian of the first person, and it is therefore possible to determine whether or not the first person is to be excluded from being a subject person, in accordance with the actual development of the first person. Furthermore, it is possible for the device to notify only the second person of a confirmation as to whether or not the first person is to be excluded from being a subject person, and it is possible for settings to be changed without letting the first person himself or herself know.

A robot according to another aspect of the present disclosure is the aforementioned device, provided with: a spherical main casing from which a first side section and a second side section that opposes the first side section have been cut out; a first spherical crown section corresponding to the first side section; and a second spherical crown section corresponding to the second side section. According to this configuration, the aforementioned device can be applied to a robot.

A method according to another aspect of the present disclosure is a method in a device that interacts with a user, in which a processor provided in the device determines whether or not a first person appears in a video of the periphery of the device acquired by a camera, or whether or not speech of the first person is included in a sound from the periphery of the device acquired by a microphone, in a case where it is detected that a driving mechanism that drives the device is to start driving in accordance with predetermined content executed by the device, the first person being designated as a subject person in first data stored in a memory, the first data indicating at least attributes of a plurality of people and whether or not the plurality of people are a predetermined subject person, and the predetermined subject person being a person requiring predetermined attention when the device makes contact, determines whether or not the device is moving, in a case where it is determined that the first person appears in the video, or in a case where it is determined that the speech of the first person is included in the sound, and controls the driving mechanism to stop movement of the device, in a case where it is determined that the device is moving.

According to this configuration, in a case where it is detected that a driving mechanism is to start driving in accordance with predetermined content executed by the device, it is determined whether or not a first person appears in a video of the periphery of a device acquired by a camera, or whether or not speech of the first person is included in a sound from the periphery of the device acquired by a microphone. The first person is designated as a subject person in first data stored in a memory. The first data indicates at least the attributes of a plurality of people and whether or not the plurality of people are a predetermined subject person. A predetermined subject person is a person requiring predetermined attention when the device makes contact. In a case where it has been determined that the first person appears in the video, or in a case where it has been determined that the speech of the first person is included in the sound, it is determined whether or not the device is moving. In a case where it has been determined that the device is moving, the driving mechanism is controlled for the movement of the device to be stopped.

Consequently, in a case where the first person who is a subject person requiring predetermined attention when the device makes contact is in the periphery of the device and the device is moving, the movement of the device is stopped, and it is therefore possible for the first person and the device to interact while ensuring the safety of the first person who is a subject person requiring predetermined attention when the device makes contact.

A non-transitory recording medium storing a program according to another aspect of the present disclosure is a non-transitory recording medium storing a program for interacting with a user, the program causing a processor provided in a device that interacts with the user, to execute processing including: determining whether or not a first person appears in a video of a periphery of the device acquired by a camera, or whether or not speech of the first person is included in a sound from the periphery of the device acquired by a microphone, in a case where it is detected that a driving mechanism that drives the device is to start driving in accordance with predetermined content executed by the device, the first person being designated as a subject person in first data stored in a memory, the first data indicating at least attributes of a plurality of people and whether or not the plurality of people are a predetermined subject person, and the predetermined subject person being a person requiring predetermined attention when the device makes contact; determining whether or not the device is moving, in a case where it is determined that the first person appears in the video, or in a case where it is determined that the speech of the first person is included in the sound; and controlling the driving mechanism to stop movement of the device, in a case where it is determined that the device is moving.

According to this configuration, in a case where it is detected that a driving mechanism is to start driving in accordance with predetermined content executed by the device, it is determined whether or not a first person appears in a video of the periphery of a device acquired by a camera, or whether or not speech of the first person is included in a sound from the periphery of the device acquired by a microphone. The first person is designated as a subject person in first data stored in a memory. The first data indicates at least the attributes of a plurality of people and whether or not the plurality of people are a predetermined subject person. A predetermined subject person is a person requiring predetermined attention when the device makes contact. In a case where it has been determined that the first person appears in the video, or in a case where it has been determined that the speech of the first person is included in the sound, it is determined whether or not the device is moving. In a case where it has been determined that the device is moving, the driving mechanism is controlled for the movement of the device to be stopped.

Consequently, in a case where the first person who is a subject person requiring predetermined attention when the device makes contact is in the periphery of the device and the device is moving, the movement of the device is stopped, and it is therefore possible for the first person and the device to interact while ensuring the safety of the first person who is a subject person requiring predetermined attention when the device makes contact.

(Embodiments)

Hereinafter, embodiments of the present disclosure will be described with reference to the drawings. It should be noted that the same reference numbers are used for the same constituent elements in the drawings. The embodiments described hereinafter all represent specific examples of the present disclosure. The numerical values, the shapes, the constituent elements, the steps, the order of the steps, and the like given in the following embodiments are examples and are not intended to restrict the present disclosure. Furthermore, from among the constituent elements in the following embodiments, constituent elements that are not mentioned in the independent claims indicating the most significant concepts are described as optional constituent elements. In all of the embodiments, it is also possible to combine the respective content thereof.

First, details of the external appearance of a robot according to an embodiment of the present disclosure will be described with reference to FIGS. 1 and 2.

Figure 2:
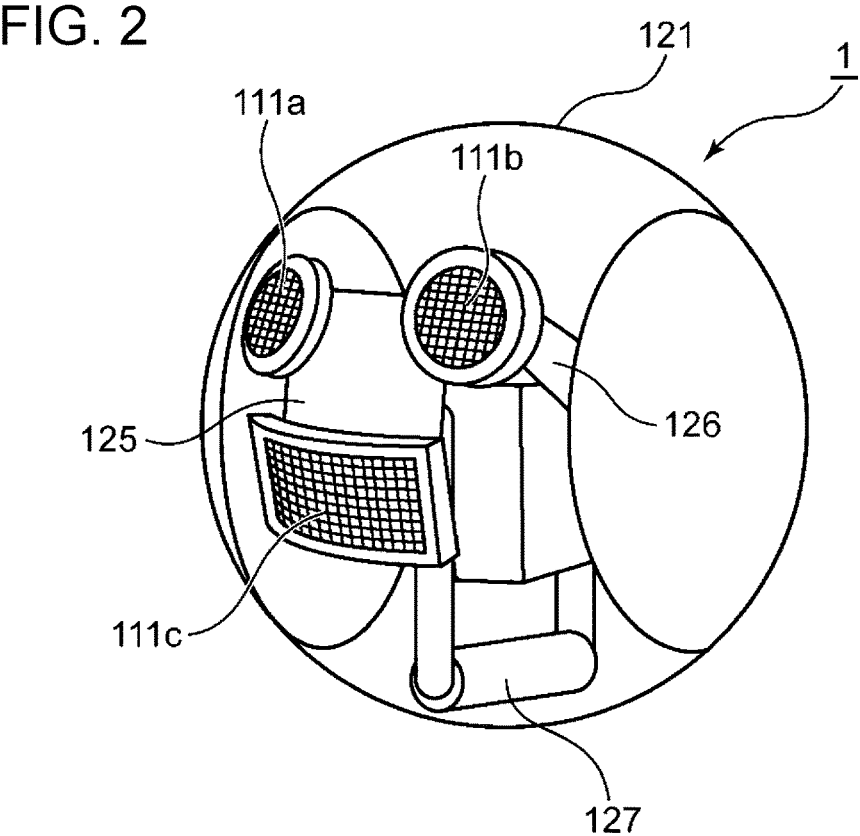
FIG. 2 is an internal perspective view of the robot that is an example of the interaction device according to the embodiment of the present disclosure.

FIG. 1 is an external perspective view of a robot that is an example of an interaction device according to an embodiment of the present disclosure, and FIG. 2 is an internal perspective view of the robot that is an example of the interaction device according to the embodiment of the present disclosure.

A robot 1 (interaction device) is provided with a spherical main casing 121, a first spherical crown section 122, and a second spherical crown section 123, as depicted in FIG. 1. The main casing 121, the first spherical crown section 122, and the second spherical crown section 123 constitute a sphere in their entirety. In other words, the robot 1 has a spherical shape. The robot 1 interacts with a user while moving in a two-dimensional manner within a predetermined space. The first spherical crown section 122 and the second spherical crown section 123 are linked by a shaft (not depicted) provided in the main casing 121. However, the shaft and the main casing 121 are not fixed. Consequently, by rotating the shaft, the first spherical crown section 122 and the second spherical crown section 123 rotate, and the robot 1 advances forward or advances backward.

Furthermore, the robot 1 is provided with a speaker 113 in the main casing 121, and is provided with a camera 101 and a microphone 103 in the first spherical crown section 122, as depicted in FIG. 1. The speaker 113 outputs speech of the robot 1. The camera 101 acquires a video of the peripheral environment of the robot 1. The microphone 103 acquires speech from the peripheral environment of the robot 1. In the present aspect, the robot 1 is provided with the speaker 113 in the main casing 121; however, it should be noted that there is no restriction thereto, and it is sufficient for the speaker 113 to be provided in any of the main casing 121, the first spherical crown section 122, and the second spherical crown section 123. In the present aspect, the robot 1 is provided with the camera 101 in the first spherical crown section 122; however, there is no restriction thereto, and it is sufficient for the camera 101 to be provided in at least either one of the first spherical crown section 122 and the second spherical crown section 123. Furthermore, by adjusting the arrangement locations and number of cameras 101, it becomes possible to acquire a 360-degree video of the surroundings of the robot 1. In the present aspect, the robot 1 is provided with the microphone 103 in the first spherical crown section 122; however, there is no restriction thereto, and it is sufficient for the microphone 103 to be provided in any of the main casing 121, the first spherical crown section 122, and the second spherical crown section 123.

The robot 1 is provided with a first display unit 111a, a second display unit 111b, and a third display unit 111c inside the main casing 121, as depicted in FIG. 2. The first display unit 111a, the second display unit 111b, and the third display unit 111c are installed on fixed sheet metal 125. The fixed sheet metal 125 is attached to the shaft by way of an arm 126. The first display unit 111a, the second display unit 111b, and the third display unit 111c are configured of a plurality of light-emitting diodes, for example. The first display unit 111a, the second display unit 111b, and the third display unit 111c display a facial expression for the robot 1. Specifically, the first display unit 111a, the second display unit 111b, and the third display unit 111c individually control the lighting up of the plurality of light-emitting diodes, and thereby display a portion of a face for the robot 1, for example, the eyes and mouth, as depicted in FIG. 1. In the example of FIGS. 1 and 2, the first display unit 111a displays an image of a right eye, the second display unit 111b displays an image of a left eye, and the third display unit 111c displays an image of a mouth. The images of the right eye, left eye, and mouth then pass through the main casing 121, which is formed of a transparent or semi-transparent material, and are radiated outside.

The robot 1 is provided with a weight 127 in the lower region inside the main casing 121, as depicted in FIG. 2. Therefore, the center of gravity of the robot 1 is positioned below the center of the main casing 121, and the movement of the robot 1 can thereby be stabilized.

Figure 3:
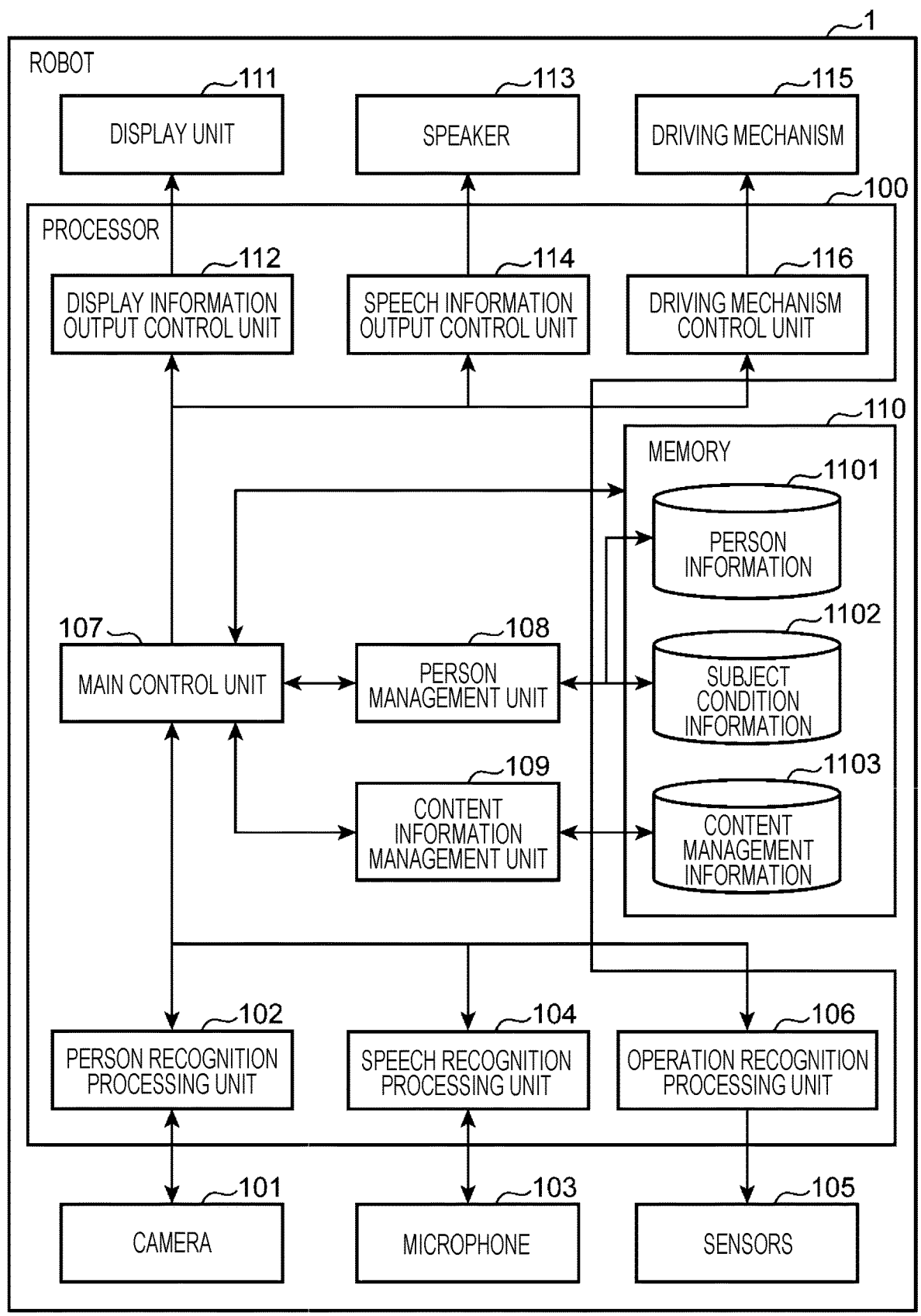
FIG. 3 is a block diagram depicting the configuration of the robot according to the embodiment of the present disclosure.

Next, details of the internal circuits of the robot 1 according to the embodiment of the present disclosure will be described with reference to FIG. 3. FIG. 3 is a block diagram depicting the configuration of the robot according to the embodiment of the present disclosure.

The robot 1 is provided with a processor 100, the camera 101, the microphone 103, sensors 105, a memory 110, a display unit 111, the speaker 113, and a driving mechanism 115, as depicted in FIG. 3. The processor 100 is provided with a person recognition processing unit 102, a speech recognition processing unit 104, an operation recognition processing unit 106, a main control unit 107, a person management unit 108, a content information management unit 109, a display information output control unit 112, a speech information output control unit 114, and a driving mechanism control unit 116. The memory 110 is a nonvolatile semiconductor memory, for example, and stores person information 1101, subject condition information 1102, and content management information 1103.

The camera 101 acquires a video of the peripheral environment of the robot 1. The microphone 103 acquires speech from the peripheral environment of the robot 1. The sensors 105, for example, are made up of an illuminance sensor, a gyro sensor, an acceleration sensor, a geomagnetic sensor, a pressure-sensitive sensor, a proximity sensor, a fingerprint authentication sensor, a vein authentication sensor, and the like. The sensors 105 acquire user operation information with respect to the robot 1.

The person recognition processing unit 102 recognizes the presence/absence, location, size, posture, type of facial expression, direction of the face, and attribute information of the user from the video acquired by the camera 101, and manages person recognition results. The position of the user indicates whether the user is sitting or standing, for example. The type of facial expression indicates whether a facial expression is a positive expression such as a smiling face or a surprised face, or whether a facial expression is a negative expression such as a sad face or a reluctant face, for example. The attribute information indicates a person ID, age, or gender for identifying the user, for example.

The speech recognition processing unit 104 recognizes the presence/absence of speech of the user, the type of speech, and attribute information from speech acquired by the microphone 103, and manages speech recognition results. The type of speech indicates whether speech is a positive expression such as a content ID for identifying content included in an utterance, "I like that", or "Let's play some more", or whether speech is a negative expression such as "I don't like that" or "Go away", for example. The attribute information indicates a person ID, age, or gender for identifying the user, for example.

The operation recognition processing unit 106 recognizes the distance to the user, the type of operation, and attribute information from information acquired by the sensors 105, and manages operation recognition results. The type of operation indicates whether an operation is a positive expression such as "touch" or "stroke", or whether an operation is a negative expression such as "hit" or "strike", for example. The attribute information indicates a person ID or age for identifying the user, for example.

Here, the operation recognition processing unit 106 recognizes the distance to the user; however, it should be noted that the person recognition processing unit 102 may recognize the distance to the user. Furthermore, the person recognition processing unit 102 may calculate the distance between the infant and the parent on the basis of the video acquired by the camera 101.

The person information 1101 is a database in which information relating to the people who use the robot 1 is registered.

FIG. 4 is a drawing depicting an example of person information in the embodiment of the present disclosure. The person information 1101 depicted in FIG. 4 includes a person ID (column 201), a name (column 202), an attribute (column 203), a nickname (column 204), a date of birth (column 205), and a subject flag (column 206). The memory 110 stores the person information 1101 in which the person ID, name, attribute, nickname, date of birth, and subject flag are associated. The person information 1101 (first data) indicates, at least, the attributes of a plurality of people and whether or not the plurality of people are a predetermined subject person. A predetermined subject person is a person requiring predetermined attention when the robot 1 makes contact. Furthermore, the person information 1101 also indicates the dates of birth of the plurality of people.

The person ID (column 201) is an ID that uniquely specifies a person. The name (column 202), nickname (column 204), and date of birth (column 205) indicate the names, nicknames, and dates of birth of the people who use the robot 1. The attribute (column 203), for example, includes information such as "parent" and "child", and indicates the relationships of the people who use the robot 1.

The person information 1101 may be set from an application on a smartphone linked to the robot 1, which is not depicted, or may be created by the robot 1 talking to the user when the robot 1 is first activated. Furthermore, the person information 1101 may be updated as required on a separate device, a server, or the like that is connected via a network. The subject flag (column 206) is information indicating whether or not a person is a subject who requires attention. For example, "0" is set as a subject flag corresponding to a person who is not a subject requiring attention, and "1" is set as a subject flag corresponding to a person who is a subject requiring attention.

It should be noted that, in the present embodiment, the person information 1101 is not restricted to these items depicted in FIG. 4, and may also include other items or may include only some of these items.

The subject condition information 1102 is a database in which conditions for subjects requiring attention are indicated. The subject condition information 1102 (third data) indicates a range for an age in months as a subject person.

FIG. 5 is a drawing depicting an example of subject condition information in the embodiment of the present disclosure. The subject condition information 1102 depicted in FIG. 5 includes a condition ID (column 301), a condition (column 302), and an age in months (column 303). The memory 110 stores the subject condition information 1102 in which the condition ID, condition, and age in months are associated. The condition ID (column 301) is an ID that uniquely specifies a condition. The condition (column 302) indicates a condition for a subject who requires attention. The age in months (column 303) indicates an age in months that is subject to the condition (column 302).

FIG. 6 is a drawing depicting an example of motor skill pass rates of infants and preschool children. FIG. 6 depicts the motor skill pass rate of infants and preschool children in a 2010 survey on the physical development of infants and preschool children conducted by the Ministry of Health, Labour and Welfare (http://www.mhlw.go.jp/toukei/list/dl/73-22-01.pdf). FIG. 6 depicts the percentage of infants and preschool children capable of carrying out each motor skill. For example, the percentage of infants having an age in months of 5 to 6 months who are capable of standing assisted is 0.5%, whereas the percentage of infants having an age in months of 14 to 15 months who are capable of standing assisted is 99.5%.

In the subject condition information 1102 depicted in FIG. 5, it is possible to set conditions and ages in months for which attention is required, on the basis of the data depicted in FIG. 6. For example, in the subject condition information 1102 in FIG. 5, the age in months that is subject to the condition "standing assisted" of row 310 is "5 to 15 months", and the age in months that is subject to the condition "walking unassisted" of row 320 is "8 to 17 months". The lowest age in months and the highest age in months for both conditions "standing assisted" and "walking unassisted" are considered, and a person having an age in months that is "5 to 17 months" is a subject who requires attention.

It should be noted that, in the present embodiment, a database in which focus has been placed upon "standing assisted" and "walking unassisted" has been given as an example; however, in the developmental stages of infants, there exist various stages such as "lifting one's head", "turning over in bed", "sitting unassisted", and "crawling", and therefore focus may be placed upon other developmental stages, which may serve as an index for determining subjects who requires attention. Furthermore, the age in months may be set with consideration being given to a grace period in which infants improve their walking. Furthermore, in a case where an elderly person is also to be considered as a subject who requires attention, an age or the like at which a physical decline and related phenomena are likely to occur may be added as a condition, such as an age at which bone density declines or an age at which an elderly person is likely to become bedridden when having fallen over. Furthermore, the subject condition information 1102 may be stored on a separate device, a server, or the like that is connected via a network, and updated at a predetermined timing.

The content management information 1103 is a database indicating a list of game and conversation content provided by the robot 1. The content management information 1103 indicates content for the robot 1 to play with the user.

Figure 7:
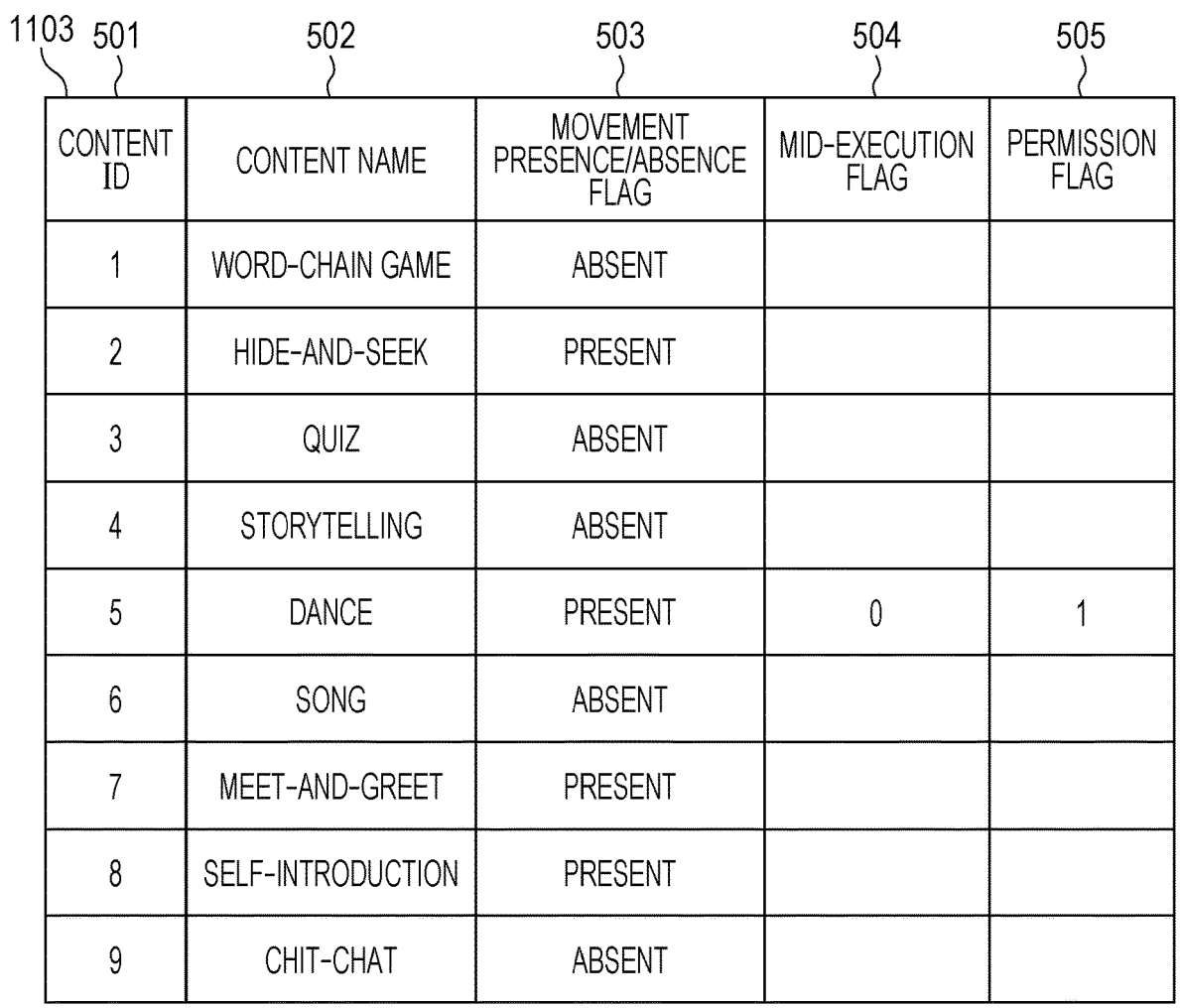
FIG. 7 is a drawing depicting an example of content management information in the embodiment of the present disclosure.

FIG. 7 is a drawing depicting an example of content management information in the embodiment of the present disclosure. The content management information 1103 depicted in FIG. 7 includes a content ID (column 501), a content name (column 502), a movement presence/absence flag (column 503), a mid-execution flag (column 504), and a permission flag (column 505). The memory 110 stores the content management information 1103 in which the content ID, content name, movement presence/absence flag, mid-execution flag, and permission flag are associated.

The content ID (column 501) indicates an ID for identifying content for the robot 1 to play with the user or the robot 1 to converse with the user. The content name (column 502) indicates a name for the content. The movement presence/absence flag (column 503) is a flag indicating whether or not the content requires movement. The mid-execution flag (column 504) is a flag that is set while the content is being executed, and indicates that the content is presently being executed. Furthermore, the permission flag (column 505) is set in cases where the movement presence/absence flag of the content being executed is "present". The permission flag is a flag indicating whether or not execution of the content is permitted by a guardian of an infant constituting a subject. As an example, the permission flag is set as "1" in a case where permission has been given by a guardian, and is set as "0" in a case where there is no subject who requires attention.

It should be noted that, in the present embodiment, the content management information 1103 is not restricted to the items described using FIG. 7, and may also include other items relating to content, such as target ages for content, information with which usage frequency such as the number of times that content has been executed is understood, or the responses of users while content is being executed, for example. It should be noted that the content management information 1103 may be stored in advance in the memory 110, or may be stored on a separate device, a server, or the like that is connected via a network, and updated at a predetermined timing.

The person management unit 108 manages the person information 1101 and the subject condition information 1102 saved in the memory 110, and outputs appropriate information to the main control unit 107 in accordance with an instruction from the main control unit 107. For example, the person management unit 108 refers to the person information 1101 and outputs whether or not a subject is present, or a person ID, nickname, or the like that matches a designated attribute, to the main control unit 107. Furthermore, the person management unit 108 determines whether or not a person designated from the main control unit 107 is a subject. The person management unit 108 determines whether or not a designated person is a subject by referring to the subject flag (column 206) of the person information 1101.

Furthermore, the person management unit 108 reconfirms whether or not a person designated by the main control unit 107 is a subject at the present point in time, and returns that confirmation result to the main control unit 107. Specifically, in a case where "4" has been designated as the person ID from the main control unit 107, the person management unit 108 calculates the age in months of "Ai" from the date of birth of "Ai" in row 240 of the person information 1101 (FIG. 4) and the present date. In a case where the age in months of "Ai" is 17 months, this does not match the condition of "standing assisted" in row 310 of FIG. 5 but does match the condition of "walking unassisted" in row 320. Therefore, the person management unit 108 can determine that "Ai" is a subject who requires attention at the present point in time.

Furthermore, the person management unit 108 updates the person information 1101 by means of an instruction for the main control unit 107. For example, when reconfirmation is carried out as to whether or not a designated person is a subject at the present point in time, in a case where it is determined that the age in months of the person who has been a subject up to that point in time is beyond the age in months for a subject, the person management unit 108 notifies the person ID of the person who has been determined as no longer being a subject, to the main control unit 107. The main control unit 107 confirms with a parent as to whether there is a problem if the person who is now beyond the age in months satisfying the conditions for being a person requiring predetermined attention is excluded from being a subject. In a case where there has been a positive response from the parent, the main control unit 107 designates the person ID, and outputs an instruction for the person to be excluded from being a subject, to the person management unit 108. The person management unit 108 sets the subject flag 206 corresponding to the person ID received from the main control unit 107 to "0". There are large individual differences in the development of infants. Therefore, even if the age in months of an infant is beyond the age in months for a subject, the person management unit 108 excludes the infant from the subjects only if a parent has given his or her consent. It should be noted that the method for confirming with a parent may be a method in which confirmation is carried out from an application on a smartphone linked to the robot 1, which is not depicted, a method in which the robot 1 asks a parent, or any other method.

Furthermore, here, the person management unit 108 reconfirms whether or not a subject has been excluded from being a subject at the present point in time, when an instruction to reconfirm the subject at the present point in time has been received from the main control unit 107; however, the timing or method for the reconfirmation may be different therefrom. For example, the person management unit 108 may acquire, in advance, the date on which the age in months changes from the date of birth (column 205) of a subject (column 206) in the person information 1101, and, each month, may reconfirm whether the age in months of the subject is beyond the age in months for the subject conditions, by referring to the subject condition information 1102 on the days on which the age in months increases. Furthermore, the person management unit 108 may notify the main control unit 107 in a case where a person who has been excluded from being a subject has been detected.

It should be noted that the person management unit 108 may immediately set the subject flag to "0" when it is detected that the age in months of a subject is beyond the age in months for the subject conditions, without the main control unit 107 confirming with a parent.

The content information management unit 109 manages the content management information 1103 saved in the memory 110. The content information management unit 109 returns, to the main control unit 107, the result of confirming whether or not content permitted by a parent is being executed, or the result of selecting content that matches a condition from the content management information 1103, in accordance with an instruction from the main control unit 107. In a case where content is to be selected, the content information management unit 109 selects content to be provided to a user, from among all content or from among content that does not involve movement of the robot 1.

Furthermore, the content information management unit 109 receives content information of content to be executed by the robot 1 (the content ID or content name, for example) and permission information (information "1" indicating having been permitted by a parent, or information "0" indicating that there is no subject who requires attention, for example), and updates the content management information 1103, in accordance with an instruction from the main control unit 107. It should be noted that the information received from the main control unit 107 may include person information for executing content (a person ID, for example), the responses of users while content is being executed, or the like, and it is also possible for the content information management unit 109 to manage information such as who has executed which content and how many times that content has been executed, or the responses of users while content is being executed, as history. Then, when content is to be selected, the content information management unit 109 may select content with consideration being given to other undepicted information relating to content, such as information with which usage frequency such as the number of times content has been executed is understood, the responses of users while content is being executed, or target ages for content.

The display unit 111 is configured of a plurality of light-emitting diodes, for example, and displays display information of a facial expression for the robot 1. Specifically, the display unit 111 individually controls the lighting up of the plurality of light-emitting diodes, and thereby displays a portion of the face of the robot 1, for example, the eyes and mouth. It should be noted that, in the present embodiment, the display unit 111 includes the first display unit 111*a*, the second display unit 111*b*, and the third display unit 111*c* depicted in FIG. 2.

The display information output control unit 112 outputs, to the display unit 111, display information of the facial expression for the robot 1 corresponding to an action control command transmitted from the main control unit 107. The display unit 111 then outputs a facial expression for the robot 1.

The speech information output control unit 114 outputs speech information of the robot 1 to the speaker 113 in accordance with an action control command that is output from the main control unit 107. The speaker 113 then outputs the speech information of the robot 1.

The driving mechanism 115 drives the robot 1. The driving mechanism 115 is configured of a plurality of motors, frames, gears, driving belts, and shafts, for example, and outputs movements for the robot 1. Specifically, the driving mechanism 115 causes the robot 1 to move by controlling the plurality of motors.

The driving mechanism control unit 116 outputs, to the driving mechanism 115, information that causes the driving mechanism 115 of the robot 1 to move, in accordance with an action control command transmitted from the main control unit 107. The driving mechanism 115 then outputs a movement for the robot 1.

The main control unit 107 detects that the driving mechanism 115 is to start driving in accordance with predetermined content. Then, in a case where it has been detected that the driving mechanism 115 is to start driving in accordance with the predetermined content, the main control unit 107 controls the driving mechanism 115 to rotate the robot 1. The main control unit 107 causes the camera 101 to acquire a video when the robot 1 is rotating.

The main control unit 107 acquires a person recognition result for a user from the person recognition processing unit 102. The main control unit 107 acquires a speech recognition result for the user from the speech recognition processing unit 104. The main control unit 107 acquires an operation recognition result for the user from the operation recognition processing unit 106.

The main control unit 107 acquires information relating to the person information 1101 and the subject condition information 1102 from the person management unit 108. Furthermore, the main control unit 107 issues an instruction to update the information relating to the person information 1101 and the subject condition information 1102, to the person management unit 108. In a case where it has been detected that the driving mechanism 115 is to start driving in accordance with predetermined content executed by the robot 1, the main control unit 107 determines whether or not a first person appears in a video, or whether or not speech of the first person is included in a sound. Here, the first person is designated as a subject person in the person information 1101 (first data) stored in the memory 110, and is an infant having an age in months that is 5 to 17 months, for example.

For example, the main control unit 107 acquires a person recognition result from the person recognition processing unit 102, and confirms with the person management unit 108 as to whether or not the recognized person is a subject. Furthermore, the main control unit 107 confirms with the person management unit 108 as to whether or not a subject is present in the person information 1101, reconfirms the subject conditions for a subject with the person management unit 108, and requests the person management unit 108 to update the person information 1101.

In a case where it is determined that an infant (first person) appears in the video, the main control unit 107 refers to the person information 1101 (first data) and the subject condition information 1102 (third data) stored in the memory 110, and determines whether or not the infant (first person) corresponds to an age in months as a subject person. In a case where it is determined that the infant (first person) does not correspond to an age in months as a subject person, the main control unit 107 controls the speaker 113 to output speech that confirms with a second person as to whether the infant (first person) may be excluded from being a subject person. Here, the second person is indicated as a guardian of the infant (first person) by the attributes in the person information 1101 (first data), and is a parent of the infant (first person), for example. In a case where a positive response to excluding the infant (first person) from being a subject person is acquired from the parent (second person) from a video or sound, the main control unit 107 cancels the designation of the infant (first person) as a subject person in the person information 1101 (first data).

It should be noted that, in a case where it is determined that the infant (first person) does not correspond to an age in months as a subject person, the main control unit 107 may transmit a notification confirming whether the infant (first person) may be excluded from being a subject person, to a terminal of the parent (second person). In this case, when a notification indicating consent to excluding the infant (first person) from being a subject person has been received from the terminal, the main control unit 107 may cancel the designation of the infant (first person) as a subject person in the person information 1101 (first data).

The main control unit 107 acquires information relating to the content management information 1103 from the content information management unit 109. Furthermore, the main control unit 107 issues an instruction to update the information relating to the content management information 1103, to the content information management unit 109. For example, the main control unit 107 confirms with the content information management unit 109 as to whether or not the robot 1 is executing content that is permitted by a parent, and receives a confirmation result from the content information management unit 109. Furthermore, the main control unit 107 receives the result of having selected content that matches a condition from the content management information 1103. Furthermore, when the execution of content has been started, the main control unit 107 notifies the content information management unit 109 with information of the content that has been started and information relating to parental permission, and instructs the content management information 1103 to be updated.

The main control unit 107 causes the speaker 113 to output speech requesting the second person to play together with the infant (first person) and the robot 1, after the robot 1 has stopped moving. The main control unit 107 selects first content for playing together with the infant (first person) and the parent (second person), on the basis of the content management information 1103 (second data) stored in the memory 110, in a case where a positive response to playing together is acquired from the parent (second person) from a video or sound. Here, the first content includes content that involves movement of the robot 1 and content that does not involve movement of the robot 1. It should be noted that execution of the predetermined content is permitted by the parent (second person).

Furthermore, in a case where a positive response to playing together is not acquired from the parent (second person) from a video or sound, the main control unit 107 determines whether or not the sound includes speech of the infant (first person) or a third person requesting to play with the robot 1. Here, the third person is different from the infant (first person) and the parent (second person), is not designated as a subject person in the person information 1101 (first data), and is an older brother or older sister of the infant (first person), for example. In a case where it is determined that a sound includes speech of the infant (first person) or the older brother (third person) requesting to play with the robot 1 in a manner that does not involve movement of the robot 1, the main control unit 107 selects second content for playing together with the infant (first person) and the older brother (third person), on the basis of the content management information 1103 (second data). Here, the second content does not involve movement of the robot 1.

However, in a case where it is determined that the sound does not include speech of the infant (first person) or the older brother (third person) requesting to play with the robot 1, the main control unit 107 causes the speaker 113 to output speech for notifying that the robot 1 is to sleep thereafter, or speech indicating a snoring sound, and causes the display unit 111 to display a facial expression in which both eyes are closed.

The main control unit 107 generates action control commands on the basis of information acquired from the person management unit 108 and the content information management unit 109, and transmits various types of action control commands to the display information output control unit 112, the speech information output control unit 114, and the driving mechanism control unit 116. It should be noted that the details of action control processing for generating an action control command will be described hereinafter.

The main control unit 107, in accordance with the selected first content, carries out at least any of: first processing in which the speaker 113 is controlled to output speech corresponding to the first content; second processing in which the display unit 111 is controlled to output a representation corresponding to the first content; and third processing in which the driving mechanism 115 is controlled to cause movement corresponding to the first content. At such time, the display unit 111 displays a facial expression for the robot 1 by means of both eyes and a mouth.

Furthermore, the main control unit 107, in accordance with the selected second content, carries out at least any of: fourth processing in which the speaker 113 is controlled to output speech corresponding to the second content; fifth processing in which the display unit 111 is controlled to output a representation corresponding to the second content; and sixth processing in which the driving mechanism 115 is controlled to cause movement corresponding to the second content. At such time, the display unit 111 displays a facial expression for the robot 1 by means of both eyes and a mouth.

In addition, the main control unit 107, after having carried out processing of at least any of the first processing, the second processing, and the third processing in accordance with the selected first content, calculates the distance between the infant (first person) and the parent (second person) on the basis of the video. In a case where the distance between the infant (first person) and the parent (second person) is not less than a threshold value, the main control unit 107 causes the speaker 113 to output speech that confirms with the parent (second person) as to whether or not it is possible to play together with the infant (first person) and the robot 1. In a case where a positive response to playing together is not acquired from the parent (second person) from a video or sound, and it is determined that the sound includes speech of the infant (first person) or the older brother (third person) requesting to play with the robot 1 in a manner that does not involve movement of the robot 1, the main control unit 107 selects second content for playing together with the infant (first person) and the older brother (third person), on the basis of the content management information 1103 (second data). The main control unit 107 then carries out at least any of the fourth processing, the fifth processing, and the sixth processing in accordance with the selected second content.

However, in a case where the distance between the infant (first person) and the parent (second person) is not less than a threshold value, a positive response to playing together is not acquired from the parent (second person) from a video or the sound, and it is determined that the sound does not include speech of the infant (first person) or the older brother (third person) requesting to play with the robot 1, the main control unit 107 causes the speaker 113 to output speech for notifying that the robot 1 is to sleep thereafter, or speech indicating a snoring sound, and causes the display unit 111 to display a facial expression in which both eyes are closed.

When various types of actions or games incorporated into the robot 1 such as singing a song, searching for a person, or finding and approaching a person are to be executed, the main control unit 107 monitors whether or not a movement is to be started, and carries out action control processing before a movement is started.

In a case where it is determined that the infant (first person) appears in the video, or in a case where it is determined that speech of the infant (first person) is included in the sound, the main control unit 107 determines whether or not the robot 1 is moving. In a case where it is determined that the robot 1 is moving, the main control unit 107 controls the driving mechanism 115 to stop the movement of the robot 1.

Furthermore, the main control unit 107 calculates the distance to the infant (first person) on the basis of the video after the robot 1 has stopped moving. In a case where the distance to the infant (first person) is less than a threshold value, the main control unit 107 determines whether or not the infant (first person) is sitting, on the basis of the video. In a case where it is determined that the infant (first person) is not sitting, the main control unit 107 carries out at least any of: seventh processing in which the speaker 113 is made to output speech that prompts the infant (first person) to sit; eighth processing in which the display unit 111 is made to face downward; and ninth processing in which the display unit 111 is made to display a predetermined representation. It should be noted that, in the ninth processing, the display unit 111 displays a facial expression for the robot 1 by means of the eyes and mouth, and the predetermined representation indicates a sad facial expression.

It should be noted that some or all of the configuration of the processor 100 and the memory 110 may be provided in a server that is communicably connected with the robot 1 via a network.

Next, the action control processing in the robot 1 according to the embodiment of the present disclosure will be described with reference to FIGS. 8 and 9.

Figure 8:
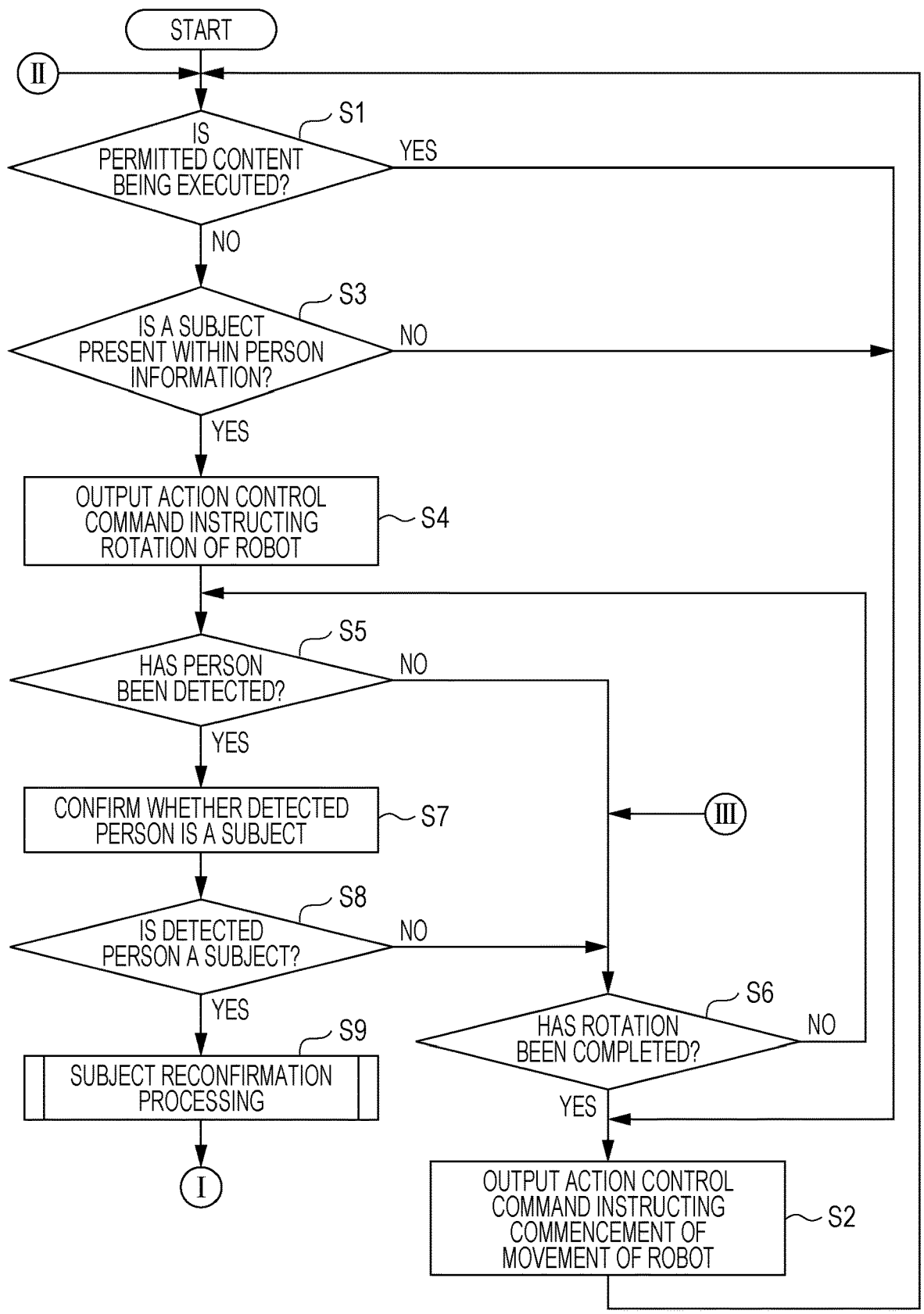
FIG. 8 is a first flowchart depicting an example of action control processing in the robot according to the embodiment of the present disclosure.
Figure 9:
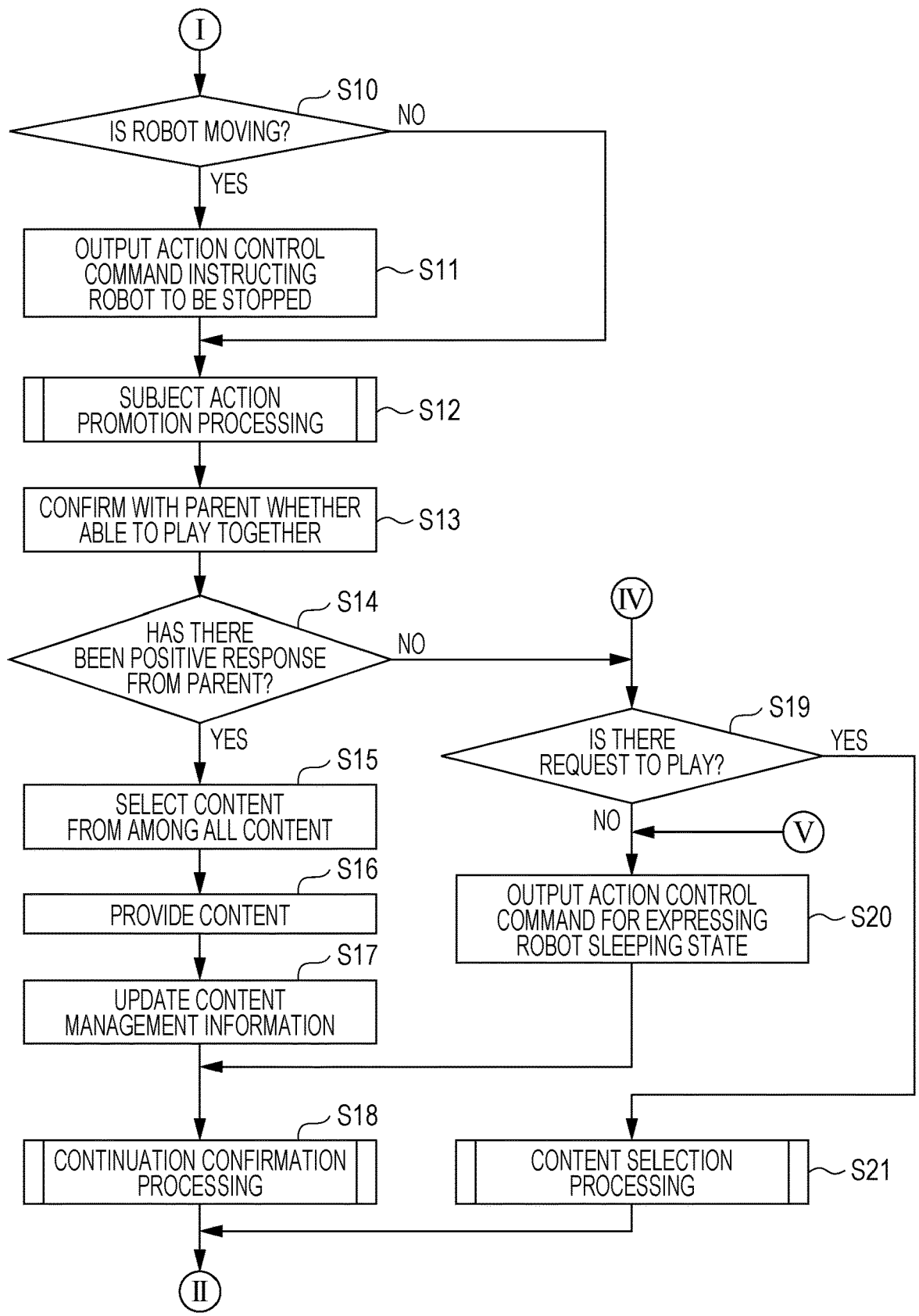
FIG. 9 is a second flowchart depicting an example of action control processing in the robot according to the embodiment of the present disclosure.

FIG. 8 is a first flowchart depicting an example of action control processing in the robot according to the embodiment of the present disclosure, and FIG. 9 is a second flowchart depicting an example of action control processing in the robot according to the embodiment of the present disclosure.

First, the main control unit 107 determines whether or not the robot 1 is executing content that is permitted by a parent (step S1). The main control unit 107 confirms with the content information management unit 109 as to whether or not the robot 1 is executing content that is permitted by a parent. The content information management unit 109 refers to the content management information 1103, and determines whether or not the permission flag has been set with respect to content for which the mid-execution flag has been set. In a case where content for which the permission flag has been set is being executed, the content information management unit 109 notifies the main control unit 107 that the robot 1 is executing content that has been permitted by a parent. However, in a case where content for which the permission flag has been set is not being executed, the content information management unit 109 notifies the main control unit 107 that the robot 1 is not executing content that has been permitted by a parent. Here, in a case where it has been determined that the robot 1 is executing content permitted by a parent ("yes" in step S1), the main control unit 107 outputs an action control command instructing commencement of movement of the robot 1, to the driving mechanism control unit 116, in order to execute a movement to be carried out during content that has been already permitted by a parent (step S2).

However, in a case where it has been determined that the robot 1 is not executing content permitted by a parent ("no" in step S1), the main control unit 107 confirms with the person management unit 108 as to whether or not a subject is present within the person information 1101, and determines whether or not a subject is present within the person information 1101 (step S3). Here, in a case where it has been determined that a subject is not present within the person information 1101 ("no" in step S3), since there is no subject who requires attention, the main control unit 107 outputs an action control command instructing commencement of movement of the robot, to the driving mechanism control unit 116 (step S2).

However, in a case where it has been determined that a subject is present within the person information 1101 ("yes" in step S3), the main control unit 107 outputs an action control command instructing rotation of the robot 1, to the driving mechanism control unit 116, in order to confirm whether the subject is present in the surroundings (step S4). The robot 1 makes one rotation with the direction perpendicular to the ground as the rotation axis, the surroundings can thereby be confirmed by means of the camera 101 installed on the robot 1, and a person can therefore be detected by the person recognition processing unit 102 when there is a person in the surroundings.

Next, the main control unit 107 confirms with the person recognition processing unit 102 as to whether or not a person has been detected, and determines whether or not a person has been detected (step S5). In a case where it has been determined that a person has not been detected ("no" in step S5), the main control unit 107 confirms with the driving mechanism control unit 116 as to whether or not rotation has been completed, and determines whether or not rotation has been completed (step S6). It should be noted that the main control unit 107 determines that rotation has been completed when the robot 1 has made one rotation. In a case where it has been determined that rotation has not been completed ("no" in step S6), there is a possibility of a person being detected by the robot 1 rotating further, and therefore processing returns to step S5.

However, in a case where it has been determined that rotation has been completed ("yes" in step S6), the main control unit 107 determines that there is no person in the surroundings of the robot 1, and outputs an action control command instructing commencement of movement of the robot 1, to the driving mechanism control unit 116 (step S2).

In a case where it has been determined that a person has been detected ("yes" in step S5), the main control unit 107 acquires information (the person ID, for example) of the detected person from the person recognition processing unit 102, outputs the acquired information (the person ID, for example) of the person to the person management unit 108, and confirms whether or not the detected person is a subject (step S7).

Next, the main control unit 107 receives a response as to whether or not the detected person is a subject who requires attention, from the person management unit 108, and determines whether or not the detected person is a subject (step S8). Here, in a case where it has been determined that the detected person is not a subject ("no" in step S8), processing transitions to step S6, and the main control unit 107 determines whether or not rotation has been completed.

However, in a case where it has been determined that the detected person is a subject ("yes" in step S8), the main control unit 107 carries out subject reconfirmation processing for reconfirming whether the detected person who is a subject satisfies a condition for a subject (step S9). It should be noted that the timing at which the subject reconfirmation processing is carried out is not restricted to this timing. For example, when the date internally managed by the robot 1 has been updated, the main control unit 107 may carry out the subject reconfirmation processing for all subjects within the person information 1101. In this case, whether or not a subject matches a condition in the subject condition information 1102 can be confirmed on a daily basis.

Here, the subject reconfirmation processing will be described with reference to FIG. 10.

Figure 10:
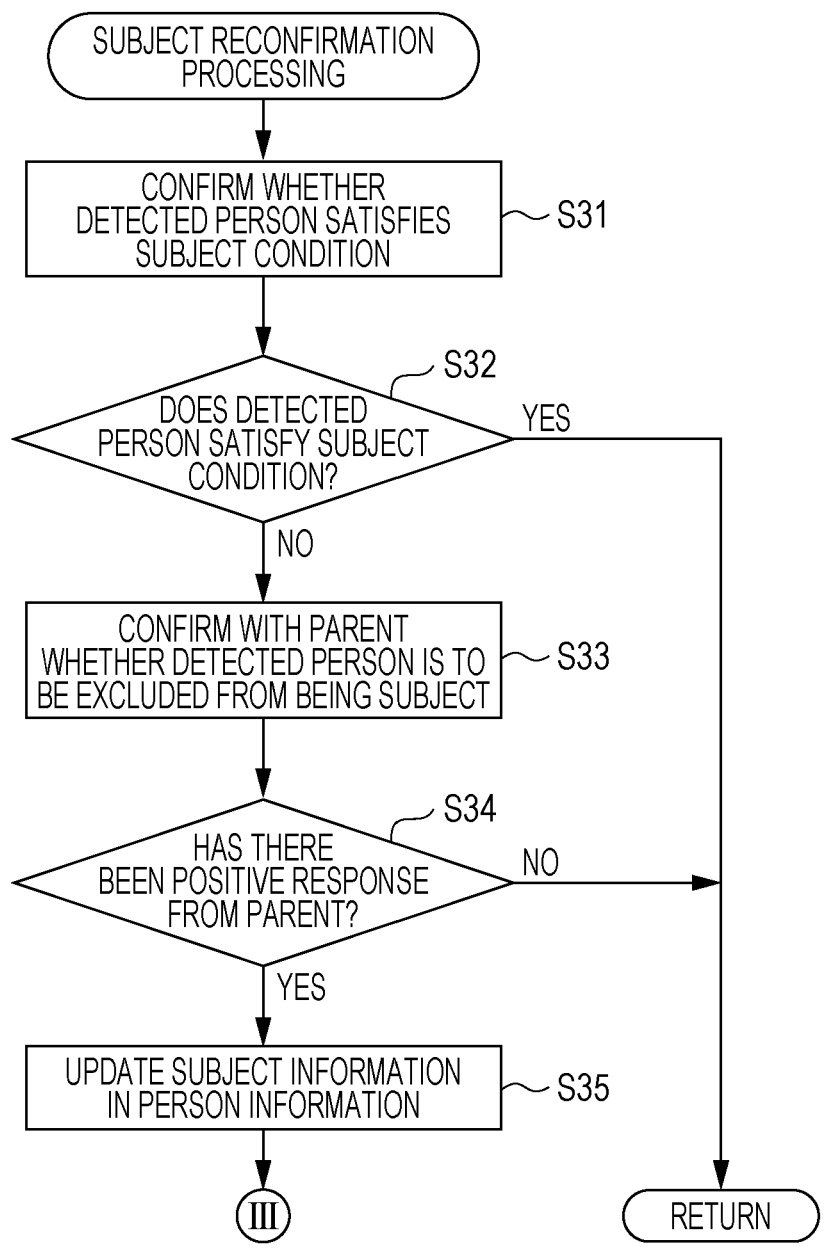
FIG. 10 is a flowchart for describing subject reconfirmation processing in step S9 of FIG. 8.

FIG. 10 is a flowchart for describing subject reconfirmation processing in step S9 of FIG. 8.

First, the main control unit 107 confirms with the person management unit 108 as to whether the detected person satisfies a condition for a subject at the present point in time (step S31). At such time, the main control unit 107 outputs the person ID of the detected person to the person management unit 108, and requests confirmation of subject conditions. The person management unit 108 acquires the date of birth (row 204) of the designated person from the person information 1101 on the basis of the person ID designated from the main control unit 107, and calculates the present age in months of the designated person from the date of birth and the present date. The person management unit 108 refers to the subject condition information 1102, and determines whether or not the age in months of the person designated from the main control unit 107 matches a condition for a subject.

Specifically, in a case where the person ID of "4" has been designated from the main control unit 107, the person management unit 108 calculates the present age in months of "Ai" from the date of birth of "Ai" in row 240 of the person information 1101 (see FIG. 4) and the present date. In a case where the present age in months of "Ai" is 17 months, this age in months does not match the condition of "standing assisted" in row 310 of FIG. 5 but does match the condition of "walking unassisted" in row 320. Therefore, it can be determined that "Ai" is a subject who requires attention at the present point in time.

The person management unit 108 outputs a determination result as to whether or not the designated person satisfies a condition for a subject, to the main control unit 107. The main control unit 107 receives the determination result as to whether or not the designated person satisfies a condition for a subject, from the person management unit 108.

Next, the main control unit 107 determines whether or not the detected person satisfies a condition for a subject (step S32). Here, in a case where it has been determined that the detected person satisfies a condition for a subject at the present point in time ("yes" in step S32), the main control unit 107 ends the subject reconfirmation processing.

However, in a case where it has been determined that the detected person does not satisfy a condition for a subject ("no" in step S32), the main control unit 107 confirms with a parent as to whether or not the detected person is to be excluded from being a subject (step S33). This processing takes into consideration the large individual differences in the development of infants, and, in a case where a person who has been a subject no longer satisfies the conditions in the subject condition information 1102, this processing is carried out to confirm the intention of a parent rather than the robot 1 automatically excluding the person from being a subject.

Specifically, the main control unit 107 outputs an action control command for lighting up a plurality of light-emitting diodes that are in coordinates where it is possible to reproduce a questioning facial expression, for example, to the display information output control unit 112. A questioning facial expression can be reproduced by both eyes being lit up with the shape "? ?", for example. The main control unit 107 designates information (the person ID, for example) of the detected person to the person management unit 108, and acquires the nickname of the designated person from the person management unit 108, in order to confirm with a parent as to whether or not the detected person is to be excluded from being a subject. The main control unit 107 uses the nickname received from the person management unit 108, to output an action control command for causing the robot 1 to utter predetermined speech, to the speech information output control unit 114. Here, the predetermined speech is speech such as "Is Ai-chan (the nickname of the detected person) now able to walk steadily?" and "Do you give your consent to me moving freely in an environment where I am together with Ai-chan (the nickname of the detected person) in the future?", for example.

It should be noted that, in a case where the predetermined speech includes speech that calls out to a parent, the main control unit 107 designates an attribute corresponding to a parent to the person management unit 108, and requests the acquisition of the nickname of the parent. The person management unit 108 compares the attribute designated from the main control unit 107 with the attributes (column 203) in the person information 1101, and outputs the nickname (column 204) of a matching person to the main control unit 107. The main control unit 107 can thereby call out the nickname of the parent before the predetermined speech.

In addition, the main control unit 107 can also issue an instruction for the robot 1 to move in the direction of the parent, to the display information output control unit 112 and the driving mechanism control unit 116.

Specifically, the main control unit 107 requests the person management unit 108 to acquire the person ID of the parent. The person management unit 108 compares the attribute designated from the main control unit 107 with the attributes (column 203) in the person information 1101, and outputs the person ID of a person having a matching attribute to the main control unit 107. The main control unit 107 outputs the person ID received from the person management unit 108 to the person recognition processing unit 102 and carries out subject detection. The person recognition processing unit 102 recognizes a person corresponding to the person ID received from the main control unit 107, and specifies the direction in which the recognized person is present. In a case where the direction in which the recognized person is present is received from the person recognition processing unit 102, the main control unit 107 is able to output an action control command for arranging the position of the facial expression for the robot 1 in the direction in which the person is present, to the display information output control unit 112, and output an action control command for directing the front of the robot 1 in the direction in which the person is present, to the driving mechanism control unit 116.

It should be noted that, in a case where the designated person is not present in the present direction in which the robot 1 is facing, the main control unit 107 outputs an action control command for carrying out a rotation, to the driving mechanism control unit 116, in order to confirm the surroundings. The main control unit 107 then once again outputs the person ID to the person recognition processing unit 102, and causes the person recognition processing unit 102 to recognize the person corresponding to the designated person ID. When a recognition result indicating that the person corresponding to the designated person ID has been recognized is received from the person recognition processing unit 102, the main control unit 107 outputs an action control command for stopping the rotation of the robot, to the driving mechanism control unit 116. The robot 1 is thereby able to stop in a state facing the direction of the parent. Then, in a state in which the robot 1 is facing the direction of the parent, the main control unit 107 is also able to output an action control command for displaying a questioning facial expression, to the display information output control unit 112, and output an action control command for speaking predetermined speech, to the speech information output control unit 114.

It should be noted that, due to the shape of the robot 1, when a video of the surroundings is to be acquired, there may be cases where rotation is difficult in that location and movement is required. In such cases, the main control unit 107 outputs an action control command for moving at a slow speed, to the driving mechanism control unit 116. It is thereby possible to reduce the risk of the robot 1 moving in an environment in which a subject is present.

Furthermore, the main control unit 107 outputs the person ID of the parent to the operation recognition processing unit 106, and acquires the distance to the parent. The operation recognition processing unit 106 outputs the distance to the parent designated from the main control unit 107. In a case where the distance to the parent received from the operation recognition processing unit 106 is greater than or equal to a predetermined distance (3 m, for example), the main control unit 107 may add speech that calls out to the parent such as "Hello" before the predetermined speech. Furthermore, in a case where the distance to the parent is greater than or equal to the predetermined distance, the main control unit 107 may output an action control command for outputting the predetermined speech at a volume that is higher than normal, to the speech information output control unit 114.

It should be noted that, in a case where the person recognition processing unit 102 is not able to detect the person designated by the person ID even though the robot 1 has rotated, the main control unit 107 may acquire the person ID of another person having a parent attribute from the person management unit 108, carry out processing that is similar to the aforementioned, and confirm with the other person as to whether or not the detected person is to be excluded from being a subject.

It should be noted that the facial expression, speech, and movement of the robot 1 described here are examples, and there is no restriction thereto. Furthermore, the main control unit 107 may output only an action control command for causing the robot 1 to utter speech, to the speech information output control unit 114, and the robot 1 may have an exchange with a contact partner by means of only speech that is output from the speaker 113. Furthermore, the main control unit 107 may output only an action control command for displaying a facial expression or characters obtained by converting speech into text, to the display information output control unit 112, and the robot 1 may have an exchange with a contact partner by means of only input and output operations using the display unit 111. Furthermore, the main control unit 107 may output only an action control command for moving the robot 1, to the driving mechanism control unit 116, and the robot 1 may have an exchange with a contact partner by means of only drive operations using the driving mechanism 115. Furthermore, the main control unit 107 may combine these action control commands for the robot 1 to thereby have an exchange with a contact partner.

In addition, when the robot 1 is to provide a conversation or a game for the infant, the main control unit 107 may output an action control command for arranging and displaying the facial expression of the robot 1 in the direction of the face of the infant, to the display information output control unit 112, and make it easy for the infant to comprehend the actions of the robot 1.

It should be noted that the output of an action control command for arranging a representation of the robot 1 in the direction of the partner, an action control command for the robot to face 1 the direction of the partner, an action control command for adding speech that calls out to the partner in accordance with the distance to the partner, and an action control command for changing the volume of a sound in accordance with the distance to the partner can be carried out in a similar manner also in the description hereinafter.

Returning to FIG. 10, next, the main control unit 107 determines whether or not there has been a positive response from the parent with respect to confirmation as to whether or not the detected person is to be excluded from being a subject (step S34). It is determined that there has been a positive response in a case where speech that is a positive reply such as "I give my consent" or "That's fine" is recognized, or a movement for nodding the head up and down is recognized, for example.

It should be noted that the method for confirming the intention of a parent indicated in the processing of step S33 and the processing of step S34 is not restricted to that method. For example, the main control unit 107 may confirm the intention of a parent from an application on a smartphone communicably connected to the robot 1, which is not depicted. An example in which the intention of a parent is confirmed by means of an application on a smartphone will be described using FIG. 11.

Figure 11:
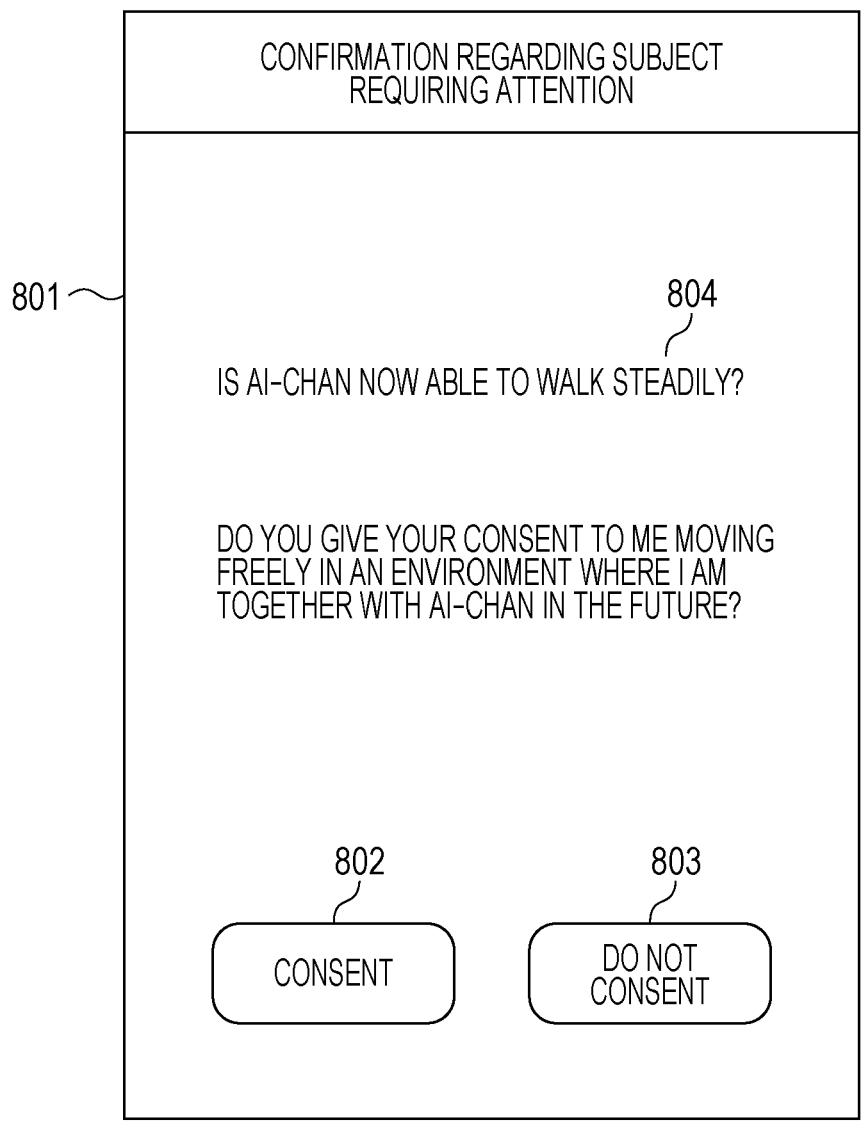
FIG. 11 is a drawing depicting an example of a display screen for confirming whether or not a detected person is to be excluded from being a subject.

FIG. 11 is a drawing depicting an example of a display screen for confirming whether or not a detected person is to be excluded from being a subject. The main control unit 107 transmits a notification for confirming whether or not a detected person may be excluded from being a subject, to an external terminal such as a smartphone that is communicably connected to the robot 1, via a communication unit that is not depicted. The external terminal, which is not depicted, receives a notification from the robot 1, and generates a display screen 801 that includes predetermined text 804 asking whether a detected person may be excluded from being a subject, and buttons 802 and 803 for inputting the intention of a parent, and displays the generated display screen 801 on a display unit of the external terminal. The parent presses either of the buttons 802 and 803 displayed on the display unit, thereby conveying the intention of the parent to the main control unit 107, from the external terminal via the communication unit. For example, the button 802 is a button for consenting to the detected person being excluded from being a subject, and the button 803 is a button for not consenting to the detected person being excluded from being a subject.

The robot 1 is thereby able to notify only a parent of confirmation as to whether or not a detected person is to be excluded from being a subject, and is able to change settings without letting the subject himself or herself know.

In a case where it has been determined that there has been a positive response from a parent with respect to the actions of the robot 1 for confirming whether or not the detected person is to be excluded from being a subject ("yes" in step S34), the main control unit 107 updates subject information in the person information 1101 (step S35). In other words, the main control unit 107 outputs the person ID of the subject to the person management unit 108, and issues an instruction for the person corresponding to the person ID to be excluded from being a subject (step S35). The person management unit 108 sets the subject flag for the subject information (column 206) corresponding to the person ID received from the main control unit 107 to "0". It should be noted that processing transitions to step S6 in FIG. 8 after the processing of step S35 has been carried out.

However, in a case where it has been determined that there has not been a positive response from a parent with respect to the actions for confirming whether or not the detected person is to be excluded from being a subject ("no" in step S34), the main control unit 107 ends the subject reconfirmation processing. It should be noted that it is determined that there has not been a positive response in a case where speech indicating a negative reply such as "I do not give my consent" has been recognized, there has been no reply from the parent, or a movement for shaking the head to the left and right has been recognized, for example.

Returning to FIG. 9, the main control unit 107 confirms with the driving mechanism control unit 116 as to whether or not the robot 1 is presently moving, and determines whether or not the robot 1 is presently moving (step S10). The main control unit 107 receives a response as to whether or not the robot 1 is moving, from the driving mechanism control unit 116, and determines whether or not the robot 1 is presently moving. In a case where it has been determined that the robot 1 is moving ("yes" in step S10), the main control unit 107 outputs an action control command instructing the robot 1 to be stopped, to the driving mechanism control unit 116 (step S11). However, in a case where it has been determined that the robot 1 is not moving, in other words, in a case where the robot 1 has stopped ("no" in step S10), processing transitions to step S12.

Next, the main control unit 107 carries out subject action promotion processing for promoting an action that increases safety, to the detected person who is a subject (step S12). Even if the robot 1 has stopped, it is feasible that the infant may already be nearby or that the infant may approach the robot 1. Therefore, in order to reduce the risk of danger, the main control unit 107 carries out subject action promotion processing and prompts the subject to sit. It should be noted that the timing at which the subject action promotion processing is carried out is not restricted to this timing. For example, the main control unit 107 may execute the subject action promotion processing at a timing at which the robot 1 plays with a subject. Furthermore, in order to increase safety, the main control unit 107 may set a timer and execute subject action promotion processing periodically.

Here, the subject action promotion processing will be described with reference to FIG. 12.

Figure 12:
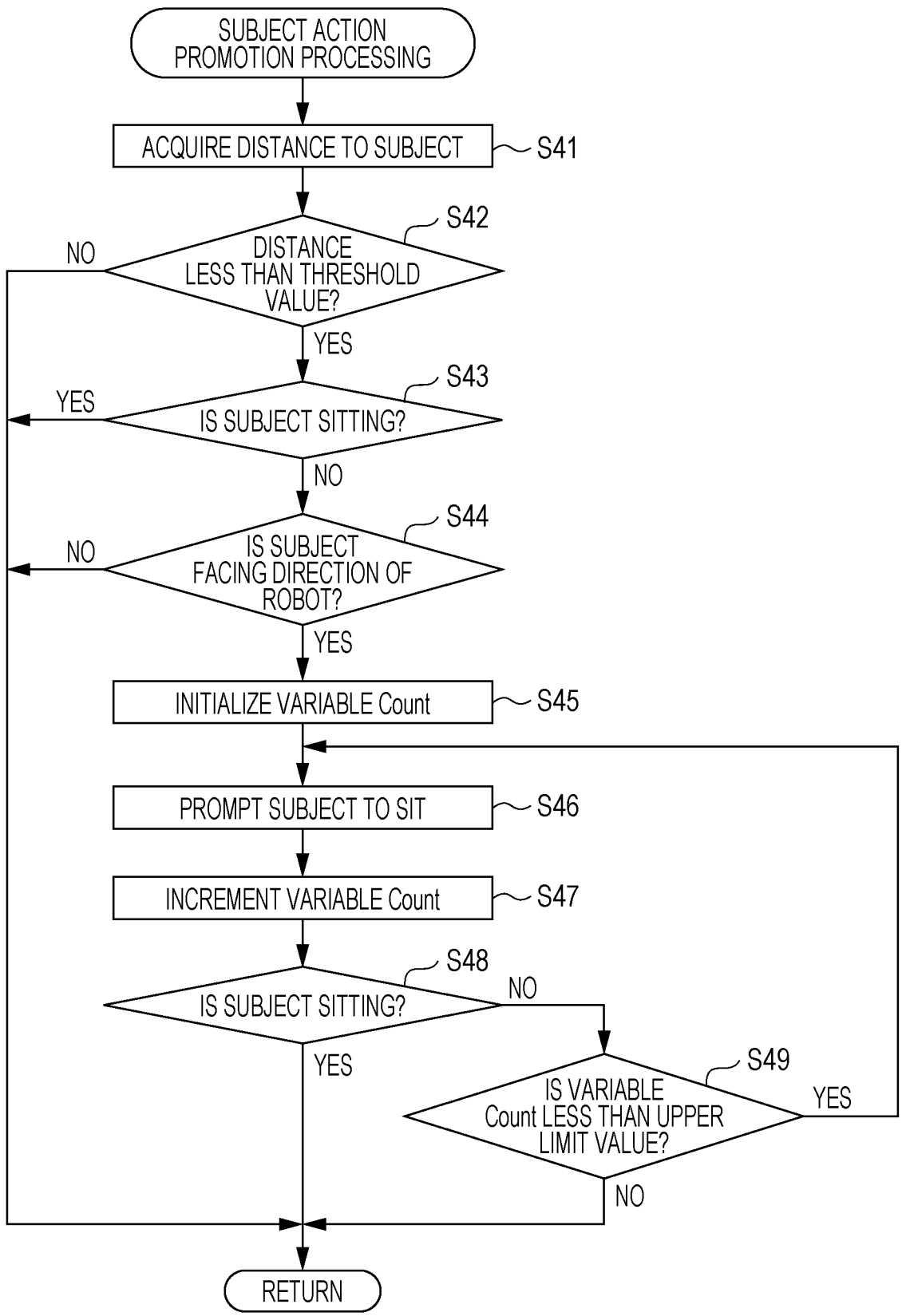
FIG. 12 is a flowchart for describing subject action promotion processing in step S12 of FIG. 9.

FIG. 12 is a flowchart for describing subject action promotion processing in step S12 of FIG. 9.

First, the main control unit 107 acquires the distance to the subject (step S41). At such time, the main control unit 107 outputs the person ID of the subject to the person recognition processing unit 102 and carries out subject detection. The person recognition processing unit 102 recognizes the subject corresponding to the person ID received from the main control unit 107. It should be noted that, in a case where the subject corresponding to the designated person ID is not present in the present direction in which the robot 1 is capturing video, the main control unit 107 outputs an action control command instructing rotation of the robot 1, to the driving mechanism control unit 116, and carries out subject detection once again. Next, the main control unit 107 outputs the person ID of the subject to the operation recognition processing unit 106, and acquires the distance to the subject. The operation recognition processing unit 106 measures the distance to the subject, and outputs the measured distance to the main control unit 107.

Next, the main control unit 107 determines whether or not the distance to the subject received from the operation recognition processing unit 106 is less than a threshold value (step S42). The threshold value is 2 m, for example. Here, in a case where it has been determined that the distance to the subject is greater than or equal to the threshold value ("no" in step S42), the robot 1 and the subject are sufficiently separated, and therefore the main control unit 107 ends the subject action promotion processing. It should be noted that the threshold value may be freely set by a parent in advance, or may be automatically set by the robot 1. Furthermore, here, the threshold value has been described with 2 m given as an example; however, there is no restriction thereto.

In a case where it has been determined that the distance to the subject is less than the threshold value ("yes" in step S42), the main control unit 107 determines whether or not the subject is sitting (step S43). At such time, the main control unit 107 outputs the person ID of the subject to the person recognition processing unit 102, and acquires information indicating the posture of the subject from the person recognition processing unit 102. The person recognition processing unit 102 recognizes the posture of the subject corresponding to the person ID, and outputs information indicating the posture of the subject that has been recognized, to the main control unit 107. For example, the person recognition processing unit 102 recognizes the posture of the subject from an outline of the body of the subject. The main control unit 107 determines whether or not the subject is sitting, on the basis of the information indicating the posture of the subject received from the person recognition processing unit 102.

Here, in a case where it has been determined that the subject is sitting ("yes" in step S43), the main control unit 107 ends the subject action promotion processing.

However, in a case where it has been determined that the subject is not sitting ("no" in step S43), the main control unit 107 outputs the person ID of the subject to the person recognition processing unit 102, recognizes whether or not the subject is facing the direction of the robot 1, and determines whether or not the subject is facing the direction of the robot 1 (step S44). For example, the person recognition processing unit 102 recognizes whether or not the subject is facing the direction of the robot 1, from the direction of the face or the direction of the body of the subject.

In a case where it has been determined that the subject is not facing the direction of the robot 1 ("no" in step S44), the subject is interested in other matters apart from the robot 1, and therefore the main control unit 107 ends the subject action promotion processing.

However, in a case where it has been determined that the subject is facing the direction of the robot 1 ("yes" in step S44), the main control unit 107 initializes a variable Count for counting the number of times that the subject is prompted to sit (step S45).

Next, the main control unit 107 prompts the subject to sit (step S46). Specifically, the main control unit 107 outputs an action control command for lighting up a plurality of light-emitting diodes that are in coordinates where it is possible to reproduce a smiling facial expression or a sad facial expression, for example, to the display information output control unit 112. It should be noted that a smiling facial expression is reproduced by both eyes being lit up with the shape "^ ^", for example, and a sad facial expression is reproduced by both eyes being lit up with the shape "> <", for example. Furthermore, the main control unit 107 designates the person ID of the subject to the person management unit 108, and requests the acquisition of the nickname of the subject. The person management unit 108 outputs, to the main control unit 107, the nickname (column 204) corresponding to the person ID designated from the main control unit 107. The main control unit 107 uses the nickname received from the person management unit 108, to output an action control command for causing the robot 1 to utter predetermined speech, to the speech information output control unit 114. It should be noted that the predetermined speech is "Ai-chan (the nickname of the subject), please sit down" or "Come on, sit down", for example. In addition, the main control unit 107 outputs an action control command for causing the robot 1 to carry out a predetermined movement that prompts the subject to sit, to the driving mechanism control unit 116. It should be noted that the predetermined movement is a movement such as the robot 1 looking down, for example.

It should be noted that the facial expression, speech, and movement of the robot 1 described here are examples, and there is no restriction thereto. Furthermore, the main control unit 107 may output only an action control command for causing the robot 1 to utter speech, to the speech information output control unit 114, and the robot 1 may have an exchange with the subject by means of only speech that is output from the speaker 113. Furthermore, the main control unit 107 may output only an action control command for displaying a facial expression or characters obtained by converting speech into text, to the display information output control unit 112, and the robot 1 may have an exchange with the subject by means of only input and output operations using the display unit 111. Furthermore, the main control unit 107 may output only an action control command for causing the robot 1 to carry out a predetermined movement, to the driving mechanism control unit 116, and the robot 1 may have an exchange with the subject by means of only drive operations using the driving mechanism 115. Furthermore, the main control unit 107 may combine these action control commands for the robot 1 to thereby have an exchange with the subject.

In addition, when the robot 1 is to provide a conversation or a game for the infant, an action control command for arranging and displaying the facial expression of the robot 1 in the direction of the face of the infant may be output to the display information output control unit 112, and it may be made easy for the infant to comprehend the actions of the robot 1.

Next, the main control unit 107 increments the variable Count (step S47).

Next, the main control unit 107 determines whether or not the subject is sitting (step S48). It should be noted that the determination processing of step S48 is the same as the determination processing of step S43. Here, in a case where it has been determined that the subject is sitting ("yes" in step S48), the main control unit 107 ends the subject action promotion processing.

However, in a case where it has been determined that the subject is not sitting ("no" in step S48), the main control unit 107 determines whether or not the variable Count is less than an upper limit value (step S49). It should be noted that the upper limit value is 3, for example, and is set in advance.

In a case where it has been determined that the variable Count is less than the upper limit value ("yes" in step S49), processing returns to step S46, and the main control unit 107 once again prompts the subject to sit. It should be noted that, in a case where the subject is repeatedly prompted to sit, the main control unit 107 may output an action control command for causing the robot 1 to utter predetermined speech having a strong tone, to the speech information output control unit 114. The predetermined speech is "Ai-chan (the nickname of the subject), please sit down" or "Come on, sit down", for example.

However, in a case where it has been determined that the variable Count is greater than or equal to the upper limit value ("no" in step S49), the main control unit 107 ends the subject action promotion processing.

Returning to FIG. 9, next, the main control unit 107 confirms with the parent as to whether or not the parent is able to play together with the robot 1 and the infant (step S13).

Specifically, the main control unit 107 outputs an action control command for lighting up a plurality of light-emitting diodes that are in coordinates where it is possible to reproduce a questioning facial expression, for example, to the display information output control unit 112. A questioning facial expression can be reproduced by both eyes being lit up with the shape "? ?", for example. Furthermore, the main control unit 107 designates an attribute of the parent to the person management unit 108, and requests the acquisition of a nickname. The person management unit 108 compares the attribute designated from the main control unit 107 with the attributes (column 203) in the person information 1101, and outputs the nickname (column 204) of a person having a matching attribute to the main control unit 107. The main control unit 107 uses the nickname received from the person management unit 108, to output an action control command for causing the robot 1 to utter predetermined speech, to the speech information output control unit 114. It should be noted that the predetermined speech is "Dad (the acquired nickname of the parent), will you play together with us?", "Dad (the acquired nickname of the parent), I want the three of us to play together including Ai-chan (the nickname of the subject)", or "It'll be lots of fun if the three of us play together!", for example.

In addition, the main control unit 107 can also issue an instruction for the robot 1 to move in the direction of the parent, to the display information output control unit 112 and the driving mechanism control unit 116.

Specifically, the main control unit 107 requests the person management unit 108 to acquire the person ID of the parent. The person management unit 108 compares the attribute designated from the main control unit 107 and the attributes (column 203) in the person information 1101, and outputs the person ID of a person having a matching attribute to the main control unit 107. The main control unit 107 outputs the person ID received from the person management unit 108 to the person recognition processing unit 102 and carries out person detection. The person recognition processing unit 102 recognizes a person corresponding to the person ID received from the main control unit 107, and specifies the direction in which the recognized person is present. In a case where the direction in which the recognized person is present is received from the person recognition processing unit 102, the main control unit 107 is able to output an action control command for arranging the position of the facial expression for the robot 1 in the direction in which the person is present, to the display information output control unit 112, and output an action control command for directing the front of the robot 1 in the direction in which the person is present, to the driving mechanism control unit 116.

It should be noted that, in a case where the designated person is not present in the present direction in which the robot 1 is facing, the main control unit 107 outputs an action control command for carrying out a rotation, to the driving mechanism control unit 116, in order to confirm the surroundings. The main control unit 107 then once again outputs the person ID to the person recognition processing unit 102, and causes the person recognition processing unit 102 to recognize the person corresponding to the designated person ID. When a recognition result indicating that the person corresponding to the designated person ID has been recognized is received from the person recognition processing unit 102, the main control unit 107 outputs an action control command for stopping the rotation of the robot 1, to the driving mechanism control unit 116. The robot 1 is thereby able to stop in a state facing the direction of the parent. Then, in a state in which the robot 1 is facing the direction of the parent, the main control unit 107 is also able to output an action control command for displaying a questioning facial expression, to the display information output control unit 112, and output an action control command for speaking predetermined speech, to the speech information output control unit 114.

It should be noted that, due to the shape of the robot 1, when a video of the surroundings is to be acquired, there may be cases where rotation is difficult in that location and movement is required. In such cases, the main control unit 107 outputs an action control command for moving at a slow speed, to the driving mechanism control unit 116. It is thereby possible to reduce the risk of the robot 1 moving in an environment in which a subject is present.

Furthermore, the main control unit 107 outputs the person ID of the parent to the operation recognition processing unit 106, and acquires the distance to the parent. The operation recognition processing unit 106 outputs the distance to the parent designated from the main control unit 107. In a case where the distance to the parent received from the operation recognition processing unit 106 is greater than or equal to a predetermined distance (3 m, for example), the main control unit 107 may add speech that calls out to the parent such as "Hello" before the predetermined speech. Furthermore, in a case where the distance to the parent is greater than or equal to the predetermined distance, the main control unit 107 may output an action control command for outputting the predetermined speech at a volume that is higher than normal, to the speech information output control unit 114.

It should be noted that, in a case where the person recognition processing unit 102 is not able to detect the person designated by the person ID even though the robot 1 has rotated, the main control unit 107 may acquire the person ID of another person having a parent attribute from the person management unit 108, carry out processing that is similar to the aforementioned, and confirm with the other person as to whether or not the other person is able to play together with the robot 1 and the infant.

It should be noted that the facial expression, speech, and movement of the robot 1 described here are examples, and there is no restriction thereto. Furthermore, the main control unit 107 may output only an action control command for causing the robot 1 to utter speech, to the speech information output control unit 114, and the robot 1 may have an exchange with a contact partner by means of only speech that is output from the speaker 113. Furthermore, the main control unit 107 may output only an action control command for displaying a facial expression or characters obtained by converting speech into text, to the display information output control unit 112, and the robot 1 may have an exchange with a contact partner by means of only input and output operations using the display unit 111. Furthermore, the main control unit 107 may output only an action control command for moving the robot 1, to the driving mechanism control unit 116, and the robot 1 may have an exchange with a contact partner by means of only drive operations using the driving mechanism 115. Furthermore, the main control unit 107 may combine these action control commands for the robot 1 to thereby have an exchange with a contact partner.

In addition, when the robot 1 is to confirm the intention of a parent, the main control unit 107 may output an action control command for arranging and displaying the facial expression of the robot 1 in the direction of the face of the infant, to the display information output control unit 112, and make it easy for the parent to comprehend the actions of the robot 1.

Next, the main control unit 107 determines whether or not there has been a positive response from the parent with respect to the actions of the robot 1 for confirming with the parent as to whether or not the parent is able to play together with the robot 1 and the infant (step S14). It is determined that there has been a positive response in a case where speech that is a positive reply such as "Yes, I'll play together with you" is recognized, or a movement for nodding the head up and down is recognized, for example.

In a case where it has been determined that there has been a positive response from the parent with respect to the actions of the robot 1 for confirming as to whether or not the parent is able to play together with the robot 1 and the infant ("yes" in step S14), the content information management unit 109 selects content for the subject, the parent, and the robot 1 to play together, from among all of the content (step S15).

Specifically, the main control unit 107 designates a content selection condition that does not particularly limit the content that is selected, and requests the content information management unit 109 to select content. The content information management unit 109 refers to the content management information 1103, selects one item of content from among all of the content, and outputs the content ID of the selected content to the main control unit 107. The main control unit 107 receives the selected content ID from the content information management unit 109.

The main control unit 107 designates a content selection condition to the content information management unit 109; however, it should be noted that the designated information is not restricted thereto. It is possible for the content information management unit 109 to select more optimum content by, for example, the main control unit 107 designating information of the subject (the person ID, age, or gender, for example) or information of the parent who is to play therewith (the person ID, age, or gender, for example).

Furthermore, the content information management unit 109 may randomly select one item of content from among all of the content. Furthermore, the content management information 1103 may include the number of times that each item of content has been executed, and the content information management unit 109 may select the content that has been executed the greatest number of times.

The main control unit 107 provides the selected content to the parent and the infant (step S16). The main control unit 107 outputs an action control command for executing the selected content, to the display information output control unit 112, the speech information output control unit 114, and the driving mechanism control unit 116. Specifically, the main control unit 107 executes a program for the content, installed in the robot 1. Thus, the main control unit 107 outputs, to the display information output control unit 112, an action control command for lighting up a plurality of light-emitting diodes that are in coordinates where a predetermined facial expression such as a smiling face, a surprised face, or a sad face is reproduced in accordance with the response of the infant. Furthermore, the main control unit 107 outputs an action control command for causing the robot 1 to utter predetermined speech that corresponds to the content, to the speech information output control unit 114. In a case where the selected content is a dance, the predetermined speech is "Ai-chan (the nickname of the subject), will you watch me dance?", "Let's dance together!", or a song, for example. Furthermore, the main control unit 107 outputs an action control command for causing a predetermined movement that corresponds to the content to be carried out, to the driving mechanism control unit 116. In a case where the selected content is a dance, the predetermined movement is a movement for swaying to the front and rear and to the left and right, a movement for moving the head to the front and rear, a movement for advancing to the front, or a movement for advancing to the rear, for example. Furthermore, an action control command may include a movement speed.

Thus, in a safe environment in which the parent also plays, or in conditions permitted by the parent, the involvement between the subject and the robot 1 can be deepened using all of the expressions that can be executed by the robot 1 also including movement.

It should be noted that the facial expression, speech, and movement of the robot 1 described here are examples, and there is no restriction thereto. Furthermore, the main control unit 107 may output only an action control command for causing the robot 1 to utter speech, to the speech information output control unit 114, and the robot 1 may have an exchange with a contact partner by means of only speech that is output from the speaker 113. Furthermore, the main control unit 107 may output only an action control command for displaying a facial expression or characters obtained by converting speech into text, to the display information output control unit 112, and the robot 1 may have an exchange with a contact partner by means of only input and output operations using the display unit 111. Furthermore, the main control unit 107 may output only an action control command for moving the robot 1, to the driving mechanism control unit 116, and the robot 1 may have an exchange with a contact partner by means of only drive operations using the driving mechanism 115. Furthermore, the main control unit 107 may combine these action control commands for the robot 1 to thereby have an exchange with a contact partner.

In addition, when the robot 1 is to provide content to the infant, the main control unit 107 may output an action control command for arranging and displaying the facial expression of the robot 1 in the direction of the face of the infant, to the display information output control unit 112, output an action control command for the robot 1 to face the direction of the infant, to the driving mechanism control unit 116, and make it easy for the infant to comprehend the actions of the robot 1.

It should be noted that the main control unit 107 may determine whether or not the subject or the parent is responding to the content started by the robot 1. Then, in a case where it is determined that the subject or the parent is not responding, the main control unit 107 may once again request the content information management unit 109 to select content, and select other content.

Furthermore, in the present embodiment, a method in which content is proposed from the robot 1 has been described as an example; however, a method may be adopted in which the robot 1 confirms with the user the content he or she wishes to play. Specifically, the main control unit 107 outputs an action control command for lighting up a plurality of light-emitting diodes that are in coordinates where it is possible to reproduce a questioning facial expression, for example, to the display information output control unit 112. A questioning facial expression can be reproduced by both eyes being lit up with the shape "? ?", for example. Furthermore, the main control unit 107 may output an action control command that causes the utterance of predetermined speech for causing the parent or infant to select content, to the speech information output control unit 114, and may ask the parent or infant for content that he or she wishes to play. The predetermined speech is "Ai-chan (the nickname of the subject), what would you like to play?", "Mom (the nickname of the parent), what kind of game do you think would be good?", or "Which would be good, a dance or a word-chain game?", for example. The main control unit 107 selects content to be provided to the parent and infant, in accordance with the response of the parent or infant when asked for content that he or she wishes to play, and starts providing the selected content. It should be noted that the response of the parent or infant includes speech such as "A dance sounds good" or "What do you recommend?", for example.

Next, the main control unit 107 updates the content management information 1103 (step S17). The main control unit 107 designates a content ID and permission flag for the content that has been started, and requests the content information management unit 109 to update the content management information 1103. The permission flag is set to "1" in a case where the executed content is content permitted by a parent, for example. The content information management unit 109 updates the content management information 1103 in accordance with the request from the main control unit 107. At such time, the content information management unit 109 sets the mid-execution flag and permission flag corresponding to the content ID designated from the main control unit 107.

Next, the main control unit 107 carries out continuation confirmation processing for confirming whether or not the parent is able to continuously play with the infant and robot 1 (step S18). There is a possibility of the parent leaving midway even when the parent has consented to playing together. Thus, the main control unit 107 executes continuation confirmation processing in order to periodically confirm whether or not the parent is near the subject, and determine whether or not a game can be continued.

Here, the continuation confirmation processing will be described with reference to FIG. 13.

Figure 13:
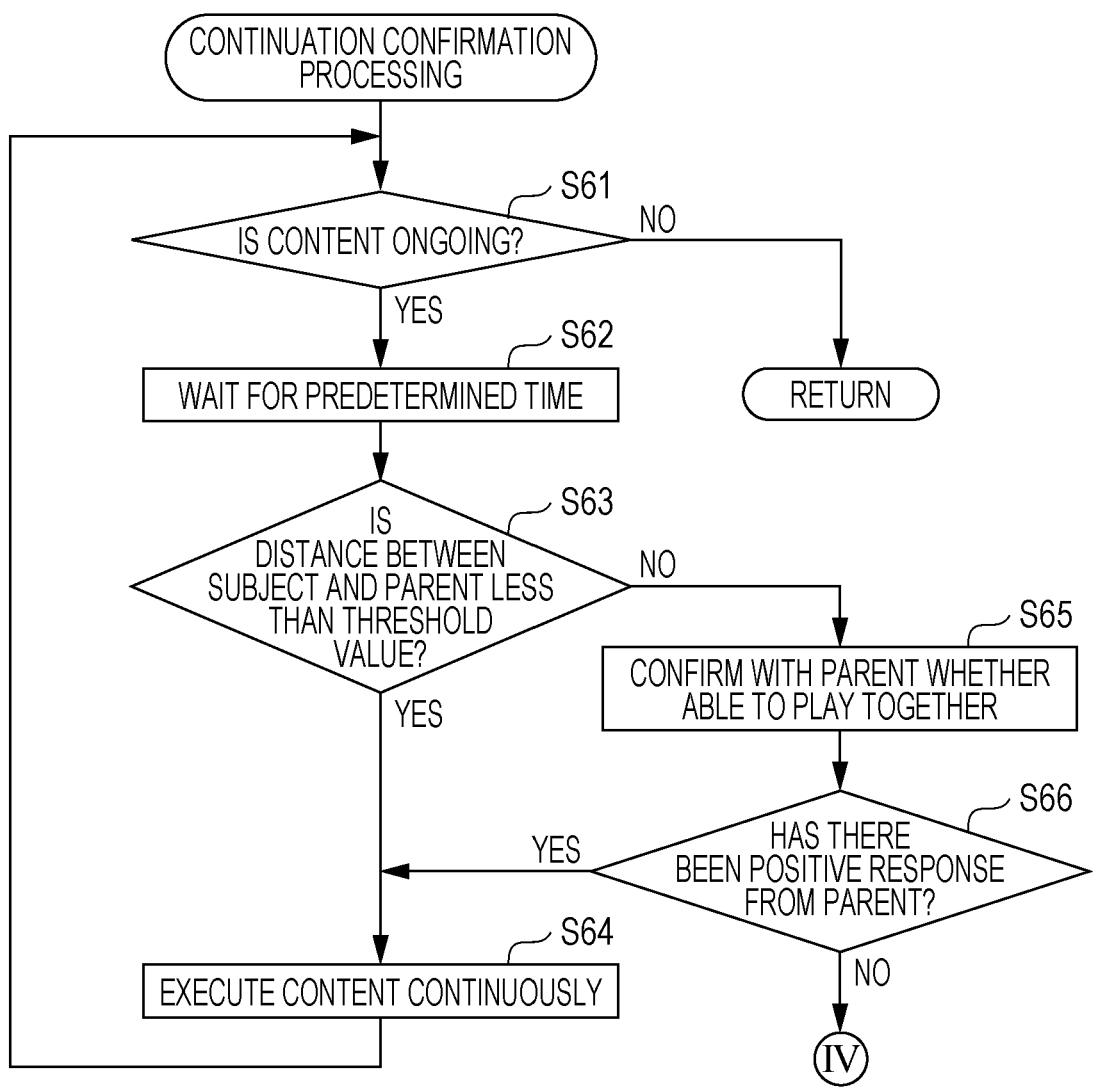
FIG. 13 is a flowchart for describing continuation confirmation processing in step S18 of FIG. 9.

FIG. 13 is a flowchart for describing continuation confirmation processing in step S18 of FIG. 9.

First, the main control unit 107 determines whether or not the content the provision of which was commenced in step S16 is ongoing (step S61). In a case where it has been determined that the content is ongoing ("yes" in step S61), the main control unit 107 waits for a predetermined time (step S62). The predetermined time is 5 minutes, for example. The predetermined time may be freely set by a parent in advance, or may be automatically set by the robot 1. Furthermore, here, the predetermined time has been described with 5 minutes given as an example; however, there is no restriction thereto.

In a case where it has been determined that the content is not ongoing ("no" in step S61), the main control unit 107 ends the continuation confirmation processing.

Next, the main control unit 107 determines whether or not the distance between the subject and the parent is less than a threshold value (step S63). Specifically, the main control unit 107 acquires the distance between the subject and the parent from the operation recognition processing unit 106, and determines whether or not the distance between the subject and the parent is less than the threshold value. The threshold value is 1.5 m, for example. This threshold value may be freely set by a parent in advance, or may be automatically set by the robot 1. Furthermore, here, the threshold value has been described with 1.5 m given as an example; however, there is no restriction thereto.

In a case where it has been determined that the distance between the subject and the parent is less than the threshold value ("yes" in step S63), the main control unit 107 executes the content continuously (step S64).

However, in a case where it has been determined that the distance between the subject and the parent is not less than the threshold value, in other words, in a case where it has been determined that the distance between the subject and the parent is greater than or equal to the threshold value ("yes" in step S63), the main control unit 107 confirms with the parent as to whether or not the parent is able to play together with the robot 1 and the infant (step S65).

Specifically, the main control unit 107 outputs an action control command for lighting up a plurality of light-emitting diodes that are in coordinates where it is possible to reproduce a questioning facial expression, for example, to the display information output control unit 112. A questioning facial expression can be reproduced by both eyes being lit up with the shape "? ?", for example. Furthermore, the main control unit 107 designates the person ID of the person who gave a positive response in step S14, and requests the person management unit 108 to acquire the nickname corresponding to the person ID. The person management unit 108 compares the person ID designated from the main control unit 107 and the person IDs (column 201) in the person information 1101, and outputs the nickname (column 204) of a person having a matching person ID to the main control unit 107. The main control unit 107 uses the nickname received from the person management unit 108, to output an action control command for causing the robot 1 to utter predetermined speech, to the speech information output control unit 114. The predetermined speech is "Dad (the acquired nickname), will you sit down together with Ai-chan?" or "Dad (the acquired nickname), can you play together with us?", for example. It should be noted that the facial expression and speech of the robot 1 described here are examples, and there is no restriction thereto.

In addition, the main control unit 107 can also issue an instruction for the robot 1 to move in the direction of the parent, to the display information output control unit 112 and the driving mechanism control unit 116.

Specifically, the main control unit 107 requests the person management unit 108 to acquire the person ID of the parent. The person management unit 108 compares the attribute designated from the main control unit 107 and the attributes (column 203) in the person information 1101, and outputs the person ID of a person having a matching attribute to the main control unit 107. The main control unit 107 outputs the person ID received from the person management unit 108 to the person recognition processing unit 102 and carries out person detection. The person recognition processing unit 102 recognizes a person corresponding to the person ID received from the main control unit 107, and specifies the direction in which the recognized person is present. In a case where the direction in which the recognized person is present is received from the person recognition processing unit 102, the main control unit 107 is able to output an action control command for arranging the position of the facial expression for the robot 1 in the direction in which the person is present, to the display information output control unit 112, and output an action control command for directing the front of the robot 1 in the direction in which the person is present, to the driving mechanism control unit 116.

It should be noted that, in a case where the designated person is not present in the present direction in which the robot 1 is facing, the main control unit 107 outputs an action control command for carrying out a rotation, to the driving mechanism control unit 116, in order to confirm the surroundings. The main control unit 107 then once again outputs the person ID to the person recognition processing unit 102, and causes the person recognition processing unit 102 to recognize the person corresponding to the designated person ID. When a recognition result indicating that the person corresponding to the designated person ID has been recognized is received from the person recognition processing unit 102, the main control unit 107 outputs an action control command for stopping the rotation of the robot 1, to the driving mechanism control unit 116. The robot 1 is thereby able to stop in a state facing the direction of the parent. Then, in a state in which the robot 1 is facing the direction of the parent, the main control unit 107 is also able to output an action control command for displaying a questioning facial expression, to the display information output control unit 112, and output an action control command for speaking predetermined speech, to the speech information output control unit 114.

It should be noted that, due to the shape of the robot 1, when a video of the surroundings is to be acquired, there may be cases where rotation is difficult in that location and movement is required. In such cases, the main control unit 107 outputs an action control command for moving at a slow speed, to the driving mechanism control unit 116. It is thereby possible to reduce the risk of the robot 1 moving in an environment in which a subject is present.

Furthermore, the main control unit 107 outputs the person ID of the parent to the operation recognition processing unit 106, and acquires the distance to the parent. The operation recognition processing unit 106 outputs the distance to the parent designated from the main control unit 107. In a case where the distance to the parent received from the operation recognition processing unit 106 is greater than or equal to a predetermined distance (3 m, for example), the main control unit 107 may add speech that calls out to the parent such as "Hello" before the predetermined speech. Furthermore, in a case where the distance to the parent is greater than or equal to the predetermined distance, the main control unit 107 may output an action control command for outputting the predetermined speech at a volume that is higher than normal, to the speech information output control unit 114.

It should be noted that, in a case where the person recognition processing unit 102 is not able to detect the person designated by the person ID even though the robot 1 has rotated, the main control unit 107 may acquire the person ID of another person having a parent attribute from the person management unit 108, carry out processing that is similar to the aforementioned, and confirm with the other person as to whether or not the other person is able to play together with the robot 1 and the infant.

It should be noted that the facial expression, speech, and movement of the robot 1 described here are examples, and there is no restriction thereto. Furthermore, the main control unit 107 may output only an action control command for causing the robot 1 to utter speech, to the speech information output control unit 114, and the robot 1 may have an exchange with a contact partner by means of only speech that is output from the speaker 113. Furthermore, the main control unit 107 may output only an action control command for displaying a facial expression or characters obtained by converting speech into text, to the display information output control unit 112, and the robot 1 may have an exchange with a contact partner by means of only input and output operations using the display unit 111. Furthermore, the main control unit 107 may output only an action control command for moving the robot 1, to the driving mechanism control unit 116, and the robot 1 may have an exchange with a contact partner by means of only drive operations using the driving mechanism 115. Furthermore, the main control unit 107 may combine these action control commands for the robot 1 to thereby have an exchange with a contact partner.

In addition, when the robot 1 is to confirm the intention of a parent, the main control unit 107 may output an action control command for arranging and displaying the facial expression of the robot 1 in the direction of the face of the infant, to the display information output control unit 112, and make it easy for the parent to comprehend the actions of the robot 1.

Next, the main control unit 107 determines whether or not there has been a positive response from the parent with respect to confirming whether or not the parent is able to play together with the robot 1 and the infant (step S66). It is determined that there has been a positive response in a case where speech that is a positive reply such as "Yes, I'll play together with you" is recognized, or a movement for nodding the head up and down is recognized, for example.

In a case where it has been determined that there has been a positive response from the parent ("yes" in step S66), the main control unit 107 executes the content continuously (step S64).

However, in a case where it has been determined that there has not been a positive response from the parent ("no" in step S66), processing transitions to step S19 of FIG. 9.

Returning to FIG. 9, in a case where it has been determined that there has not been a positive response from the parent with respect to the actions of the robot 1 for confirming whether or not the parent is able to play together with the robot 1 and the infant ("no" in step S14), the main control unit 107 determines whether or not there is a request to play with respect to the robot 1 (step S19). It is determined that there has not been a positive response in a case where speech indicating a negative reply such as "No, I can't play" has been recognized, there has been no reply from the parent, or a movement for shaking the head to the left and right has been recognized, for example.

Specifically, the main control unit 107 confirms with the speech recognition processing unit 104 whether or not speech that is an invitation to play has been recognized. Speech that is an invitation to play is "Let's play" or "Let's play a word-chain game", for example. The speech recognition processing unit 104 outputs, to the main control unit 107, a recognition result for speech that is an invitation to play, such as whether or not there has been a word that is an invitation to play, a recognized word that is an invitation to play, the person ID of a person who has spoken, or the content ID of content included in an utterance, for example. The main control unit 107 determines whether or not there is a request to play, from the recognition result received from the speech recognition processing unit 104.

Here, in a case where it has been determined that there is no request to play ("no" in step S19), the main control unit 107 outputs an action control command for expressing a state in which the robot 1 has fallen asleep, to the display information output control unit 112, the speech information output control unit 114, and the driving mechanism control unit 116 (step S20).

Specifically, the main control unit 107 outputs an action control command for lighting up a plurality of light-emitting diodes that are in coordinates where it is possible to reproduce a facial expression in which the eyes are closed, for example, to the display information output control unit 112. A facial expression in which the eyes are closed is reproduced by both eyes being lit up with the shape "--", for example. Furthermore, the main control unit 107 outputs an action control command for causing the robot 1 to utter speech indicating that the robot 1 is to go to sleep or speech indicating that the robot 1 is sleeping, to the speech information output control unit 114. Speech indicating that the robot 1 is to go to sleep is "I'm tired so I'm going to sleep for a little while" or "I'm feeling sleepy", for example. Speech indicating that the robot 1 is sleeping is "zzzzz (snoring sound)", for example. In addition, the main control unit 107 outputs an action control command for causing the robot 1 carry out a movement indicating that the robot 1 is to go to sleep or a movement indicating that the robot 1 is sleeping, to the driving mechanism control unit 116. A movement indicating that the robot 1 is to go to sleep or a movement indicating that the robot 1 is sleeping is a movement for leaning to the front and rear or to the left and right in the present location, for example.

In this way, in a situation where the parent is not able to play together with the infant, spontaneous conversation or playing from the robot 1 is avoided in order to not cause danger for the infant. By expressing a state in which the robot 1 has fallen asleep, it is possible to avoid proactive involvement with the robot 1 from the infant.

It should be noted that the facial expression, speech, and movement of the robot 1 described here are examples, and there is no restriction thereto. Furthermore, the main control unit 107 may output only an action control command for causing the robot 1 to utter speech, to the speech information output control unit 114, and the robot 1 may have an exchange with a contact partner by means of only speech that is output from the speaker 113. Furthermore, the main control unit 107 may output only an action control command for displaying a facial expression or characters obtained by converting speech into text, to the display information output control unit 112, and the robot 1 may have an exchange with a contact partner by means of only input and output operations using the display unit 111. Furthermore, the main control unit 107 may output only an action control command for causing the robot 1 to carry out a predetermined movement, to the driving mechanism control unit 116, and the robot 1 may have an exchange with a contact partner by means of only drive operations of the driving mechanism 115. Furthermore, the main control unit 107 may combine these action control commands for the robot 1 to thereby have an exchange with a contact partner.

However, in a case where it has been determined that there is a request to play ("yes" in step S19), the main control unit 107 carries out content selection processing in which content to be provided is selected in accordance with the request to play (step S21).

Here, the content selection processing will be described with reference to FIG. 14.

Figure 14:
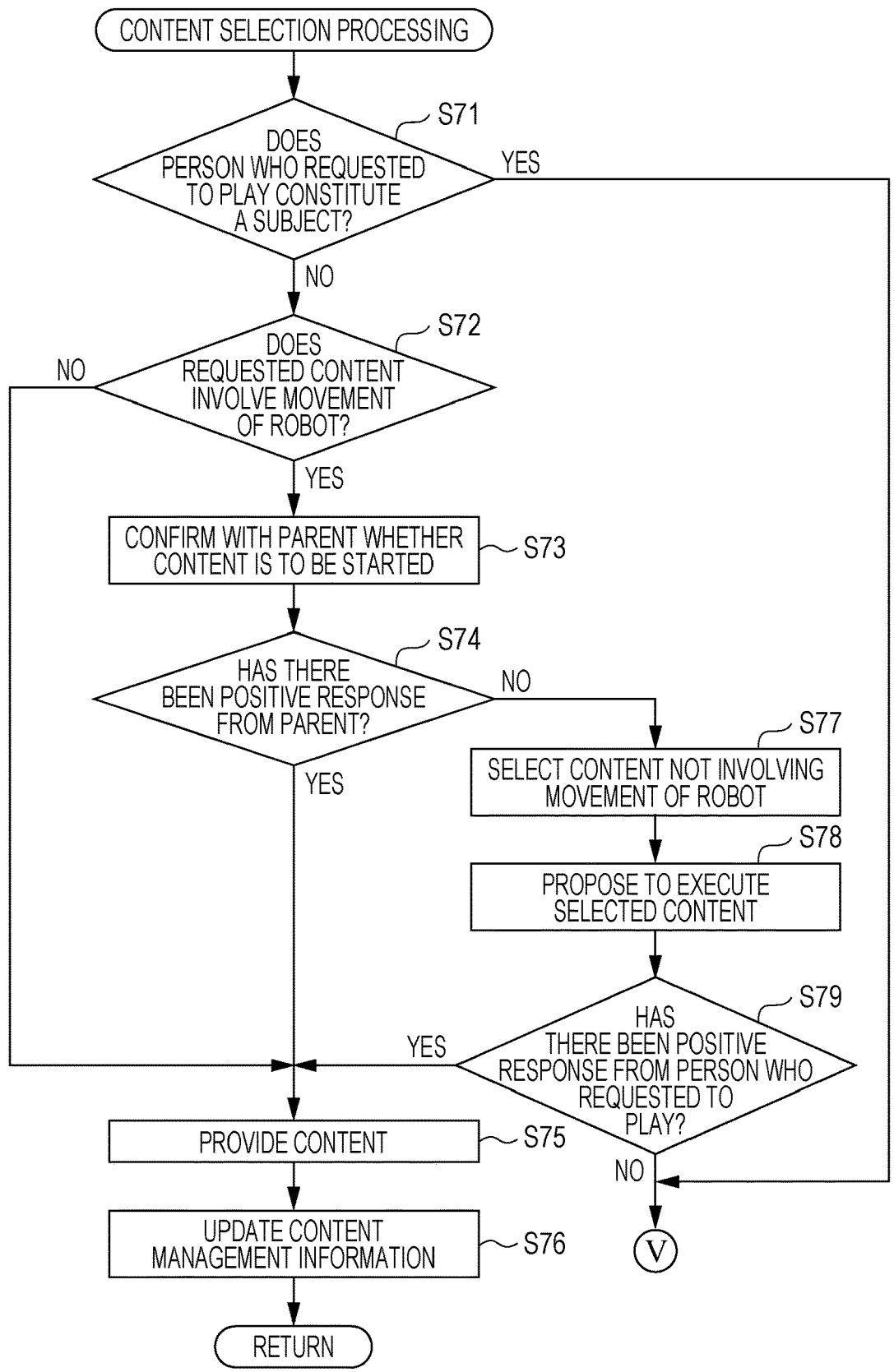
FIG. 14 is a flowchart for describing content selection processing in step S21 of FIG. 9.

FIG. 14 is a flowchart for describing content selection processing in step S21 of FIG. 9.

First, the main control unit 107 determines whether or not the person who made the request to play is a subject (step S71). The main control unit 107 acquires the person ID of the person who made the request to play, from a recognition result for speech received from the speech recognition processing unit 104. The recognition result includes whether or not there has been a word that is an invitation to play, a recognized word that is an invitation to play, the person ID of a person who has spoken, or the content ID of content included in an utterance, for example. The main control unit 107 designates the person ID of the person who made the request to play, and confirms with the person management unit 108 as to whether or not the designated person ID is a subject. The person management unit 108 refers to the person information 1101, and determines whether or not the person corresponding to the designated person ID is a subject. The person management unit 108 outputs information as to whether or not the person corresponding to the designated person ID is a subject, to the main control unit 107. The main control unit 107 determines whether or not the person who made the request to play is a subject, on the basis of the information as to whether or not the speaker is a subject received from the person management unit 108.

Here, in a case where it has been determined that the person who made the request to play is a subject ("yes" in step S71), processing transitions to step S20 of FIG. 9, and the main control unit 107 outputs an action control command for expressing a state in which the robot 1 has fallen asleep, to the display information output control unit 112, the speech information output control unit 114, and the driving mechanism control unit 116.

In this way, in a situation where the parent is not able to play together with the subject, even if the subject has made a request to play, safety is prioritized, and it is possible to avoid proactive involvement with the robot 1 from the subject by expressing a state in which the robot 1 has fallen asleep. Here, for safety, a state in which the robot 1 has fallen asleep is expressed in a case where a request to play has been made from a subject; however, it should be noted that the present disclosure is not particularly restricted thereto. For example, in a case where a request to play has been made from a subject, the main control unit 107 may select and provide only restricted content that does not involve movement of the robot 1.

However, in a case where it has been determined that the person who made the request to play is not a subject ("no" in step S71), the main control unit 107 determines whether or not the requested content is content that involves movement of the robot 1 (step S72). A request to play from a person who is not a subject is a request to play from a family member other than the subject and the parents such as an older brother or older sister of the subject.

Specifically, the main control unit 107 acquires the content ID of content included in an utterance, from a recognition result for speech received from the speech recognition processing unit 104. The main control unit 107 confirms with the content information management unit 109 as to whether or not the content corresponding to the designated content ID is content that involves movement of the robot 1. The content information management unit 109 refers to the content management information 1103, and outputs information indicating whether or not the content corresponding to the designated content ID is content that involves movement of the robot 1, to the main control unit 107. The main control unit 107 receives the information indicating whether or not the content corresponding to the designated content ID is content that involves movement of the robot 1, acquired from the content information management unit 109. The main control unit 107 determines whether or not the requested content is content that involves movement of the robot 1, on the basis of the information indicating whether or not the content corresponding to the designated content ID is content that involves movement of the robot 1.

Here, in a case where it has been determined that the requested content is not content that involves movement of the robot 1, in other words, in a case where it has been determined that the requested content is content that does not involve movement of the robot 1 ("no" in step S72), the main control unit 107 provides the requested content that does not involve movement of the robot 1 (step S75). It should be noted that processing similar to the processing of step S16 is carried out for the provision of content, and therefore a description thereof is omitted.

In the present embodiment, in a case where the person who made a request to play is not a subject and the requested content is content that does not involve movement of the robot 1, the content is provided. However, it should be noted that the present disclosure is not particularly restricted thereto, and in a case where the requested content is content that does not involve movement of the robot 1, the content may be provided even if the person who made the request to play is a subject.

However, in a case where it has been determined that the requested content is content that involves movement of the robot 1 ("yes" in step S72), the main control unit 107 confirms with the parent as to whether or not the content is to be started (step S73).

Specifically, the main control unit 107 outputs an action control command for lighting up a plurality of light-emitting diodes that are in coordinates where it is possible to reproduce a questioning facial expression, for example, to the display information output control unit 112. A questioning facial expression can be reproduced by both eyes being lit up with the shape "? ?", for example.

Furthermore, the main control unit 107 uses the nicknames of the parent and the person who requested to play received from the person management unit 108, to output an action control command for causing the robot 1 to utter predetermined speech, to the speech information output control unit 114. The predetermined speech is "Dad (the acquired nickname), may I play hide and seek with Haru-kun (the nickname of the person who requested to play)?", for example.

In addition, the main control unit 107 can also issue an instruction for the robot 1 to move in the direction of the parent, to the display information output control unit 112 and the driving mechanism control unit 116. Furthermore, the main control unit 107 outputs the person ID of the parent to the operation recognition processing unit 106, acquires the distance to the parent, and is thereby also able to add speech that calls out to the parent corresponding to the distance, and set the volume of the sound in accordance with the distance. It should be noted that these specific confirmation methods are the same as the aforementioned confirmation methods, and therefore descriptions thereof are omitted.

It should be noted that the facial expression, speech, and movement of the robot 1 described here are examples, and there is no restriction thereto. Furthermore, the main control unit 107 may output only an action control command for causing the robot 1 to utter speech, to the speech information output control unit 114, and the robot 1 may have an exchange with a contact partner by means of only speech that is output from the speaker 113. Furthermore, the main control unit 107 may output only an action control command for displaying a facial expression or characters obtained by converting speech into text, to the display information output control unit 112, and the robot 1 may have an exchange with a contact partner by means of only input and output operations using the display unit 111. Furthermore, the main control unit 107 may output only an action control command for moving the robot 1, to the driving mechanism control unit 116, and the robot 1 may have an exchange with a contact partner by means of only drive operations using the driving mechanism 115. Furthermore, the main control unit 107 may combine these action control commands for the robot 1 to thereby have an exchange with a contact partner.

In addition, when the robot 1 is to confirm the intention of a parent, the main control unit 107 may output an action control command for arranging and displaying the facial expression of the robot 1 in the direction of the face of the infant, to the display information output control unit 112, and make it easy for the parent to comprehend the actions of the robot 1.

Next, the main control unit 107 determines whether or not there has been a positive response from the parent with respect to the actions of the robot 1 for confirming with the parent as to whether or not the content that involves movement of the robot 1 is to be started (step S74). It is determined that there has been a positive response in a case where speech that is a positive reply such as "That's fine" is recognized or a movement for nodding the head up and down is recognized, for example.

In a case where it has been determined that there has been a positive response from the parent with respect to the actions of the robot 1 for confirming with the parent as to whether or not the content that involves movement of the robot 1 is to be started ("yes" in step S74), the main control unit 107 provides the requested content that involves movement of the robot 1 (step S75). It should be noted that processing similar to the processing of step S16 is carried out for the provision of content, and therefore a description thereof is omitted.

Next, the main control unit 107 updates the content management information 1103 (step S76). The main control unit 107 designates a content ID and permission flag for the content that has been started, and requests the content information management unit 109 to update the content management information 1103. The permission flag is set to "1" in a case where the executed content is content permitted by a parent, for example. The content information management unit 109 updates the content management information 1103 in accordance with the request from the main control unit 107. At such time, the content information management unit 109 sets the mid-execution flag and permission flag corresponding to the content ID designated from the main control unit 107.

However, in a case where it has been determined that there has not been a positive response from the parent with respect to the actions of the robot 1 for confirming with the parent as to whether or not the content that involves movement of the robot 1 is to be started ("no" in step S74), the content information management unit 109 selects content that does not involve movement of the robot 1 (step S77). It should be noted that it is determined that there has not been a positive response in a case where speech indicating a negative reply such as "No, please stop" has been recognized, there has been no reply from the parent, or a movement for shaking the head to the left and right has been recognized, for example.

Specifically, the main control unit 107 designates a content selection condition for selecting content that does not involve movement of the robot 1, and requests the content information management unit 109 to select content that does not involve movement of the robot 1. The content information management unit 109 refers to the content management information 1103, selects one item of content from among all of the content for which the movement presence/absence flag has been set to "absent", and outputs the content ID and the content name of the selected content to the main control unit 107. The main control unit 107 receives the selected content ID from the content information management unit 109.

It should be noted that the content information management unit 109 may randomly select one item of content from among all of the content that does not involve movement of the robot 1. Furthermore, the content management information 1103 may include the number of times that each item of content has been executed, and the content information management unit 109 may select the content not involving movement of the robot 1 that has been executed the greatest number of times.

Next, the main control unit 107 proposes executing the content selected by the content information management unit 109, to the person who made the request to play (step S78).

Specifically, the main control unit 107 outputs an action control command for lighting up a plurality of light-emitting diodes that are in coordinates where it is possible to reproduce a questioning facial expression, for example, to the display information output control unit 112. A questioning facial expression can be reproduced by both eyes being lit up with the shape "? ?", for example. Furthermore, the main control unit 107 outputs, to the speech information output control unit 114, an action control command for causing the robot 1 to utter predetermined speech that proposes jointly executing the content selected by the content information management unit 109. The predetermined speech is "Shall we sing together?", for example. In addition, the main control unit 107 can also issue an instruction for the robot 1 to move in the direction of the person who made the request to play, to the display information output control unit 112 and the driving mechanism control unit 116. Furthermore, the main control unit 107 may output the person ID of the person who made the request to play, to the operation recognition processing unit 106, and acquire the distance to the person who made the request to play. The main control unit 107 can then also add speech that calls out to the person who made the request to play corresponding to the distance, and set the volume of the sound in accordance with the distance. It should be noted that these specific proposal methods are the same as the aforementioned confirmation methods, and therefore descriptions thereof are omitted.

It should be noted that the facial expression, speech, and movement of the robot 1 described here are examples, and there is no restriction thereto. Furthermore, the main control unit 107 may output only an action control command for causing the robot 1 to utter speech, to the speech information output control unit 114, and the robot 1 may have an exchange with a contact partner by means of only speech that is output from the speaker 113. Furthermore, the main control unit 107 may output only an action control command for displaying a facial expression or characters obtained by converting speech into text, to the display information output control unit 112, and the robot 1 may have an exchange with a contact partner by means of only input and output operations using the display unit 111. Furthermore, the main control unit 107 may output only an action control command for moving the robot 1, to the driving mechanism control unit 116, and the robot 1 may have an exchange with a contact partner by means of only drive operations using the driving mechanism 115. Furthermore, the main control unit 107 may combine these action control commands for the robot 1 to thereby have an exchange with a contact partner.

In addition, when the robot 1 is to confirm the intention of the person who made the request to play, the main control unit 107 may output an action control command for arranging and displaying the facial expression of the robot 1 in the direction of the face of the person who made the request to play, to the display information output control unit 112, and make it easy for the person who made the request to play to comprehend the actions of the robot 1.

Next, the main control unit 107 determines whether or not there has been a positive response from the person who made the request to play, with respect to the proposal from the robot 1 for executing content that does not involve movement of the robot 1 (step S79). It is determined that there has been a positive response in a case where speech that is a positive reply such as "That's fine" is recognized or a movement for nodding the head up and down is recognized, for example.

Here, in a case where it has been determined that there has been a positive response from the person who made the request to play ("yes" in step S79), the main control unit 107 provides the selected content that does not involve movement of the robot 1 (step S75).

However, in a case where it has been determined that there has not been a positive response from the person who made the request to play, with respect to the proposal from the robot 1 for executing content that does not involve movement of the robot 1 ("no" in step S79), processing transitions to step S20 of FIG. 9. It is determined that there has not been a positive response in a case where speech indicating a negative reply such as "No way" has been recognized, there has been no reply from the person who made the request to play, or a movement for shaking the head to the left and right has been recognized, for example. In step S20, as previously mentioned, the main control unit 107 outputs an action control command for expressing a state in which the robot 1 has fallen asleep, to the display information output control unit 112, the speech information output control unit 114, and the driving mechanism control unit 116.

Thus, in a situation where the parent is not able to play together with the subject, the parent does not permit the subject and a person who is different from the subject playing in a manner that involves movement of the robot 1, and the person who made the request to play does not wish to play in a manner that does not involve movement of the robot 1, by expressing a state in which the robot 1 has fallen asleep, the safety of the subject is prioritized, and it is possible to avoid proactive involvement with the robot 1 from the subject.

As mentioned above, according to the present embodiment, it is possible to safely control the actions of the robot 1 on the basis of the relationship with the action partner with whom the robot 1 performs an action, and to provide a control method for the robot 1 with which a subject who requires attention such as a subject who is in the developmental stage of walking is able to play safely.

Furthermore, according to the aforementioned embodiment, the intention of the parent is clearly confirmed in a case where a subject who requires attention is present; however, the present disclosure is not particularly restricted thereto, and it may be confirmed whether or not the distance between the parent and the subject is less than a predetermined distance, one item of content may be selected from all of the content in a case where the distance between the parent and the subject is less than the predetermined distance, and an action control command for expressing a state in which the robot 1 has fallen asleep may be output in a case where the distance between the parent and the subject is greater than or equal to the predetermined distance.

In the present disclosure, some or all of the units, devices, members, or parts, or some or all of the functional blocks of the block diagrams depicted in the drawings may be implemented as one or more electronic circuits including a semiconductor device, a semiconductor integrated circuit (IC), or a large scale integration (LSI). An LSI or an IC may be integrated in one chip or may be configured by combining a plurality of chips. For example, function blocks other than storage elements may be integrated in one chip. Here, reference has been made to an LSI and IC, but the naming system changes depending on the degree of integration, and reference may also be made to a system LSI, a very large scale integration (VLSI), or an ultra large scale integration (ULSI). A field programmable gate array (FPGA) that is programmed after manufacturing an LSI or a reconfigurable logic device that allows the reconfiguration of the connection relationship or the setup of circuit cells inside the LSI can be used for the same purpose.

In addition, it is also possible for the functions or operations of some or all of the units, devices, members, or parts to be implemented by means of software processing. In such a case, software is recorded on one or more non-transitory recording mediums such as a ROM, an optical disk, or a hard disk drive, and when the software is executed by a processor, the software causes the processor together with peripheral devices to execute the functions specified in the software. A system or device may be provided with one or more non-transitory recording mediums on which software has been recorded, a processor, and necessary hardware devices such as an interface.

The device, method, recording medium storing a program, and robot according to the present disclosure are useful as a device, method, recording medium storing a program, and robot for interacting with a user, with which it is possible for a first person and the device to interact while ensuring the safety of the first person, the first person being a subject person requiring predetermined attention when the device makes contact.

What is claimed is:

1. A device that interacts with a user, the device comprising:
    a camera that acquires a video of a periphery of the device;
    a microphone that acquires a sound from the periphery of the device;
    a driving mechanism that drives the device;
    a memory that stores first data, the first data indicating attributes of a plurality of people and whether or not the plurality of people includes a predetermined subject person, and the predetermined subject person being a person requiring predetermined attention when the device makes contact therewith; and
    a processor that:
        determines whether or not a first person appears in the video, or whether or not a speech of the first person is included in the sound, in a case where the processor detects that the driving mechanism is to start driving in accordance with predetermined content executed by the device, the first person being designated as a subject person in the first data stored in the memory; and
        determines whether or not the device is moving, in a case where the processor determines that the first person appears in the video, or in a case where the processor determines that the speech of the first person is included in the sound.

2. The device according to claim 1,
    wherein, in the case where the processor detects that the driving mechanism is to start driving in accordance with the predetermined content executed by the device, the processor controls the driving mechanism to rotate the device from a stationary position, and
    causes the camera to acquire the video when the device is rotating.

3. The device according to claim 1, further comprising:
    a speaker; and
    a display,
    wherein the device is in a stopped position in a case driving mechanism is controlled to stop the movement of the device, and
    wherein the processor:
    causes the speaker to output a speech requesting a second person to play together with the first person and the device, after the device has stopped moving, the second person being indicated as a guardian of the first person by the attributes in the first data;

selects first content for playing together with the first person and the second person, based on second data stored in the memory, in a case where a positive response of the second person to the speech requesting the second person to play together is acquired from the video or the sound, the second data indicating content for the device to play with the user, and the first content including content that involves a movement of the device and content that does not involve a movement of the device; and executes, in accordance with the first content, at least any of:

a first processing in which the speaker is controlled to output a speech that corresponds to the first content;

a second processing in which the display is controlled to output a representation that corresponds to the first content, the display displaying a first facial expression for the device, the first facial expression including eyes and a mouth; and a third processing in which the driving mechanism is controlled to cause a movement of the device that corresponds to the first content from the stopped position of the device.

4. The device according to claim 3, wherein the processor:

determines whether or not the sound includes a speech of the first person or a third person requesting to play with the device, in a case where a positive response of the second person to the speech requesting the second person to play together is not acquired from the video or the sound, the third person being different from the first person and the second person, and the third person not being designated as the subject person in the first data;

selects second content for playing together with the first person and the third person, based on the second data, in a case where the processor determines that the sound includes a speech of the first person or the third person requesting to play with the device in a manner that does not involve a movement of the device, the second content being content that does not involve a movement of the device; and executes, in accordance with the second content, at least any of:

a fourth processing in which the speaker is controlled to output a speech that corresponds to the second content;

a fifth processing in which the display is controlled to output a representation that corresponds to the second content, the display displaying a second facial expression, the second facial expression including the eyes and the mouth; and a sixth processing in which the driving mechanism is controlled to cause a movement that corresponds to the second content.

5. The device according to claim 3, wherein the processor:

determines whether or not the sound includes a speech of the first person or a third person requesting to play with the device, in a case where a positive response of the second person to the speech requesting the second person to play together is not acquired from the video or the sound, the third person being different from the first person and the second person, and the third person not being designated as the subject person in the first data;

causes the speaker to output a speech indicating a snoring sound or a speech for notifying that the device is to sleep thereafter, in a case where the processor determines that the sound does not include the speech of the first person or the third person requesting to play with the device; and causes the display to display a third facial expression in which the eyes are displayed as being closed.

6. The device according to claim 3, wherein the processor:

calculates a distance between the first person and the second person, based on the video, after having carried out execution of at least any of the first processing, the second processing, and the third processing in accordance with the selected first content;

causes the speaker to output a speech that confirms with the second person as to whether or not the second person is to play together with the first person and the device, in a case where the distance is not less than a threshold value;

selects second content for playing together with the first person and a third person, based on the second data, in a case where a positive response of the second person to the speech requesting the second person to play together is not acquired from the video or the sound, and the processor determines that the sound includes a speech of the first person or the third person requesting to play with the device in a manner that does not involve a movement of the device, the third person being different from the first person and the second person, the third person not being designated as the subject person in the first data, and the second content being content that does not involve a movement of the device; and executes, in accordance with the second content, at least any of:

a seventh processing in which the speaker is controlled to output a speech that corresponds to the second content;

an eighth processing in which the display is controlled to output a representation that corresponds to the second content, the display displaying a fourth facial expression, the fourth facial expression including the eyes and the mouth; and a ninth processing in which the driving mechanism is controlled to cause a movement that corresponds to the second content.

7. The device according to claim 3, wherein the processor:

calculates a distance between the first person and the second person, based on the video, after executing at least any of the first processing, the second processing, and the third processing in accordance with the selected first content;

causes the speaker to output a speech that confirms with the second person as to whether or not the second person is to play together with the first person and the device, in a case where the distance is not less than a threshold value;

causes the speaker to output a speech indicating a snoring sound or a speech for notifying that the device is to sleep thereafter, in a case where a positive response of the second person to the speech requesting the second person to play together is not acquired from the video or the sound, and the processor determines that the sound does not include a speech of the first person or a third person requesting to play with the device, the third person being different from the first person and the second person, and the third person not being designated as the subject person in the first data; and causes the display to display a fifth facial expression in which the eyes are displayed as being closed.

8. The device according to claim 3,
wherein execution of the predetermined content is permitted by the second person.

9. The device according to claim 1, further comprising:
a speaker; and
a display,
wherein the processor:
calculates a distance to the first person based on the video, after the device has stopped moving;
determines whether or not the first person is sitting, based on the video, in a case where the distance is less than a threshold value; and
in a case where the processor determines that the first person is not sitting, executes at least any of:
a tenth processing in which the speaker is controlled to output a speech that prompts the first person to sit;
an eleventh processing in which the display is controlled to face downward; and
a twelfth processing in which the display is controlled to display a predetermined representation, the display displaying a sixth facial expression for the device, the sixth facial expression including eyes and a mouth, and the predetermined representation indicating a sad facial expression.

10. The device according to claim 1, further comprising a speaker,
wherein the first data further indicates dates of birth of the plurality of people, and the processor:
refers to the first data and third data stored in the memory, to determine whether or not the first person corresponds to an age in months as the subject person, in a case where the processor determines that the first person appears in the video, the third data indicating a range for the age in months as the subject person;
controls the speaker to output a speech that confirms with the second person as to whether or not the first person is to be excluded from being the subject person, in a case where the processor determines that the first person does not correspond to the age in months as the subject person, the second person being indicated as a guardian of the first person by the attributes in the first data; and
cancels a designation of the first person as the subject person in the first data, in a case where a positive response, from the second person, to the speech that confirms as to whether or not the first person is to be excluded from being the subject person is acquired from the video or the sound.

11. The device according to claim 1,
wherein the first data further indicates dates of birth of the plurality of people, and the processor:
refers to the first data and third data stored in the memory, to determine whether or not the first person corresponds to an age in months as the subject person, in a case where the processor determines that the first person appears in the video, the third data indicating a range for the age in months as the subject person;
transmits, to a terminal of the second person, a notification that confirms whether the first person is to be excluded from being the subject person, in a case where the processor determines that the first person does not correspond to the age in months as the subject person, the second person being indicated as a guardian of the first person by the attributes in the first data; and
cancels a designation of the first person as the subject person in the first data, in a case where a notification that indicates consent to exclude the first person from being the subject person is received from the terminal.

12. A robot,
which is the device according to claim 1, and
which comprises:
a spherical main casing from which a first side section and a second side section that opposes the first side section have been cut out;
a first spherical crown section corresponding to the first side section; and
a second spherical crown section corresponding to the second side section.

13. A method for interacting with a user using a device having a processor, a camera, a microphone, a driving mechanism and a memory, the method comprising:
acquiring, by the camera, a video of a periphery of the device;
acquiring, by the microphone, a sound from the periphery of the device;
driving, by the driving mechanism, the device;
storing, in the memory, first data, the first data indicating attributes of a plurality of people and whether or not the plurality of people includes a predetermined subject person, and the predetermined subject person being a person requiring predetermined attention when the device makes contact therewith;
determining, by the processor, whether or not a first person appears in the video, or whether or not a speech of the first person is included in the sound, in a case where the processor detects that a driving mechanism that drives the device is to start driving in accordance with predetermined content executed by the device, the first person being designated as a subject person in the first data stored in the memory;
determining, by the processor, whether or not the device is moving, in a case where the processor determines that the first person appears in the video, or in a case where the processor determines that the speech of the first person is included in the sound; and
controlling, by the processor, the driving mechanism to stop a movement of the device, in a case where the processor determines that the device is moving.

14. A non-transitory recording medium storing a program for interacting with a user, the program causing a processor provided in a device that interacts with the user to execute operations including:
controlling a camera of the device to acquire a video of a periphery of the device;
controlling a microphone of the device to acquire a sound from the periphery of the device;
controlling a driving mechanism of the device to drive the device;
storing, in a memory of the device, first data, the first data indicating attributes of a plurality of people and whether or not the plurality of people includes a predetermined subject person, and the predetermined subject person being a person requiring predetermined attention when the device makes contact therewith;
determining whether or not a first person appears in the video, or whether or not a speech of the first person is included in the sound, in a case where the processor detects that the driving mechanism that drives the device is to start driving in accordance with predetermined content executed by the device, the first person being designated as a subject person in the first data stored in a memory;

determining whether or not the device is moving, in a case where the processor determines that the first person appears in the video, or in a case where the processor determines that the speech of the first person is included in the sound; and controlling the driving mechanism to stop a movement of the device, in a case where the processor determines that the device is moving.

* * * * *